US009860184B2

United States Patent
Briscoe

(10) Patent No.: US 9,860,184 B2
(45) Date of Patent: Jan. 2, 2018

(54) FAST FRIENDLY START FOR A DATA FLOW

(71) Applicant: BRITISH TELECOMMUNICATIONS PUBLIC LIMITED COMPANY, London (GB)

(72) Inventor: Robert John Briscoe, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 17 days.

(21) Appl. No.: 14/908,158

(22) PCT Filed: Jul. 31, 2014

(86) PCT No.: PCT/GB2014/000300
§ 371 (c)(1),
(2) Date: Jan. 28, 2016

(87) PCT Pub. No.: WO2015/015141
PCT Pub. Date: Feb. 5, 2015

(65) Prior Publication Data
US 2016/0182387 A1    Jun. 23, 2016

(30) Foreign Application Priority Data
Jul. 31, 2013  (GB) .................................. 1313760.9

(51) Int. Cl.
*H04L 12/825*  (2013.01)
*H04L 12/835*  (2013.01)
(Continued)

(52) U.S. Cl.
CPC ........ *H04L 47/263* (2013.01); *H04L 43/0864* (2013.01); *H04L 47/26* (2013.01); *H04L 47/30* (2013.01); *H04L 47/31* (2013.01)

(58) Field of Classification Search
None
See application file for complete search history.

(56) References Cited

U.S. PATENT DOCUMENTS 6,215,769 B1 * 4/2001 Ghani .................. H04L 1/1809
                                                          370/230
6,317,416 B1 * 11/2001 Giroux ................ H04L 12/5602
                                                          370/232
(Continued)

FOREIGN PATENT DOCUMENTS

EP    1 734 707       12/2006
EP    1 734 707 A2    12/2006
(Continued)

OTHER PUBLICATIONS

International Search Report for PCT/GB2014/000300, dated Jan. 5, 2015, 4 pages.
(Continued)

*Primary Examiner* — Andrew Oh
(74) *Attorney, Agent, or Firm* — Nixon & Vanderhye P.C.

(57) ABSTRACT

Disclosed is a method and apparatus for a packet data flow to use markings on packets (93, 94) that indicate the longest instantaneous queue length on a path in order to rapidly increase the flow rate up to an available capacity of a network node without overshoot, in order to avoid the TCP Slow start process.

15 Claims, 8 Drawing Sheets

- Schematic of a Typical Network

(51) Int. Cl.
*H04L 12/833* (2013.01)
*H04L 12/26* (2006.01)

(56) References Cited

U.S. PATENT DOCUMENTS

| | | | |
|---|---|---|---|
| 6,618,378 B1* | 9/2003 | Giroux | H04L 12/5601 370/235 |
| 6,646,987 B1 | 11/2003 | Qaddoura | |
| 6,839,321 B1* | 1/2005 | Chiruvolu | H04L 12/5602 370/230.1 |
| 7,680,038 B1 | 3/2010 | Gourlay | |
| 2002/0080768 A1* | 6/2002 | Garcia-Luna-Aceves | H04W 74/06 370/349 |
| 2003/0007454 A1* | 1/2003 | Shorey | H04L 47/10 370/229 |
| 2003/0120795 A1* | 6/2003 | Reinshmidt | H04L 47/20 709/232 |
| 2006/0072628 A1* | 4/2006 | Liu | H04L 41/145 370/516 |
| 2006/0184664 A1* | 8/2006 | Jung | H04L 47/10 709/224 |
| 2007/0006229 A1* | 1/2007 | Moore | H04L 47/50 718/100 |
| 2007/0081454 A1* | 4/2007 | Bergamasco | H04L 47/10 370/229 |
| 2009/0003369 A1* | 1/2009 | Lundin | H04J 3/0632 370/412 |
| 2009/0232001 A1* | 9/2009 | Gong | H04L 47/10 370/236 |
| 2010/0278042 A1* | 11/2010 | Monnes | H04L 43/0894 370/230 |
| 2013/0044598 A1 | 2/2013 | Zhang et al. | |
| 2013/0088997 A1* | 4/2013 | Briscoe | H04L 47/10 370/252 |
| 2014/0068008 A1* | 3/2014 | Tzhori | H04L 47/29 709/219 |
| 2014/0341015 A1* | 11/2014 | Johansson | H04L 69/04 370/229 |

FOREIGN PATENT DOCUMENTS

| | | | |
|---|---|---|---|
| EP | 1734707 | * 12/2006 | H04L 12/56 |
| WO | 93/14605 | 7/1993 | |
| WO | WO 93/14605 | 7/1993 | |
| WO | 2009/118602 | 10/2009 | |

OTHER PUBLICATIONS

Kuhlewind, M and Briscoe, B., "Chirping for Congestion Control—Implementation Feasibility", Proceedings of PFLDNeT'10, 2010 (7 pgs.).

KunnSrisankar S. Kunniyur, "AntiECN Marking: A Marking Scheme for High Bandwidth Delay Connections", ICC'03, IEEE International Conference on, 2003 (12 pgs.).

D. Satoh et al., "Single PCN Threshold Marking by using PCN baseline encoding for both admission and termination controls" PCN Working Group, Internet-Draft, Mar. 9, 2009 (36 pgs.).

Dwred, Cisco. "Distributed Weighted Random Early Detection." (18 pgs.).

Clark, D and Fang, W., "Explicit Allocation of Best-Effort Packet Delivery Service", IEEE/ACM Transactions on Networking, vol. 6, No. 4, Aug. 1998 (12 pgs.).

Hu, Ningning and Steenkiste, Peter, "Improving TCP Startup Performance using Active Measurements: Algorithm and Evaluation", Proceedings of the 11$^{th}$ IEEE International Conference on Network Protocols (ICNP'03), 2003 (12 pgs.).

Leung, Kui-Fai and Yeung, Kwan L., "TCP-Swift: An End-Host Enhancement Scheme for TCP over Satellite IP Networks", Department of Electrical and Electronic Engineering, The University of Hong Kong, 2004 (5 pgs.).

Liu, D. et al., "Congestion Control Without a Startup Phase", Case Western Reserve University, International Computer Science Institute, Bell Labs, Proceedings of the Workshop on Protocols for Fast Long-Distance Networks (PFLDnet), Feb. 2007 (6 pgs.).

Ha, Sangtae and Rhee, Injong, "Hybrid Slow Start for High-Bandwidth and Long-Distance Networks", Dept. of Computer Science, North Carolina State University, Proc. PFLDnet, 2008 (6 pgs.).

S. Floyd et al., "Quick-Start for TCP and IP", Network Working Group Memo, Nokia Research Center, Jan. 2007 (83 pgs.).

Venkata N. Padmanabhan and Randy H. Katz, "TCP Fast Start: A Technique for Speeding Up Web Transfers", Department of Electrical Engineering and Computer Sciences, University of California at Berkeley, in Proc. IEEE Globecom '98 Internet Mini-Conference, Sydney, Australia, Nov. 1998 (5 pgs.).

Ian F. Akyildiz et al., "TCP-Peach: A New Congestion Control Scheme for Satellite IP Networks", IEEE/ACM Transactions on Networking, vol. 9, No. 3, Jun. 2001 (15 pgs.).

V. Venkataraman et al., "A priority-layered approach to transport for high bandwidth-delay product networks", CoNEXT '08 Proceedings of the 2008 ACM CoNEXT Conference, Article No. 14 (6 pgs.).

M. Singh et al., "Utilizing spare network bandwidth to improve TCP performance", Cornell University, Poster in Proc. of ACM SIGCOMM, 2005 (1 pg.).

E. Hague and H. Kabir, "TCP Congestion control in Heterogeneous Network", Department of Computer Science and Engineering, Bangladesh University of Engineering and Technology, Aug. 20, 2007 (6 pgs.).

WAN optimization techniques http://searchenterprisewan.techtarget.com/feature/WAN-optimization-techniques, retrieved Feb. 5, 2013 (4 pgs.).

D. Cavendish et al., "CapStart: An Adaptive TCP Slow Start for High Speed Networks", 2009 First International Conference on Evolving Internet, Aug. 23-29, 2009 (6 pgs.).

M. Scharf et al., "Speeding up the 3D Web: A Case for Fast Startup Congestion Control", Proc. PFLDNet, 2009 (6 pgs.).

D. Lin and R. Morris, "Dynamics of Random Early Detection", Division of Engineering and Applied Sciences, Harvard University, ACM SIGCOMM Computer Communication Review, 1997 (11 pgs.).

B. Briscoe et al., "More Accurate ECN Feedback in TCP", Memo, Transport Area Working Group, Internet-Draft, University of Stuttgart, Jul. 2, 2014 (55 pgs.).

WAN optimization, Wikipedia http://en.wikipedia.org/w/index.php?title=WAN_optimization&printable=yes, retrieved Feb. 5, 2013 (3 pgs.).

I. Andrikopoulos et al., "Providing Rate Guarantees for Internet Application Traffic Across ATM Networks", Centre for Communication Systems Research (CCSR), University of Surrey, IEEE Communications Surveys (vol. 2, Issue 3), Dec. 1, 2009 (14 pgs.).

A. Sathiaseelan et al., "Enhancing TCP to Support Rate-Limited Traffic", CSWS '12 Proceedings of the 2012 ACM workshop on Capacity, (6 pgs.).

M. Alizadeh et al., "Less is More: Trading a little Bandwidth for Ultra-Low Latency in the Data Center", 9$^{th}$ USENIX Symposium on Networked Systems Design and Implementation, Apr. 25-27, 2012 (14 pgs.).

Cisco, I. O. S. "Release 12.1 Quality of Service Solutions Configuration Guide—Congestion Avoidance Overview." (2013) (8 pgs.).

K. Ramakrishnan et al., "The Addition of Explicit Congestion Notification (ECN) to IP", Memo, Network Working Group, EMC, Sep. 2001 (63 pgs.).

Y. Xia et al., "One More Bit is Enough", SIGCOMM'05, Aug. 22-26, 2005, Philadelphia, PA (12 pgs.).

* cited by examiner

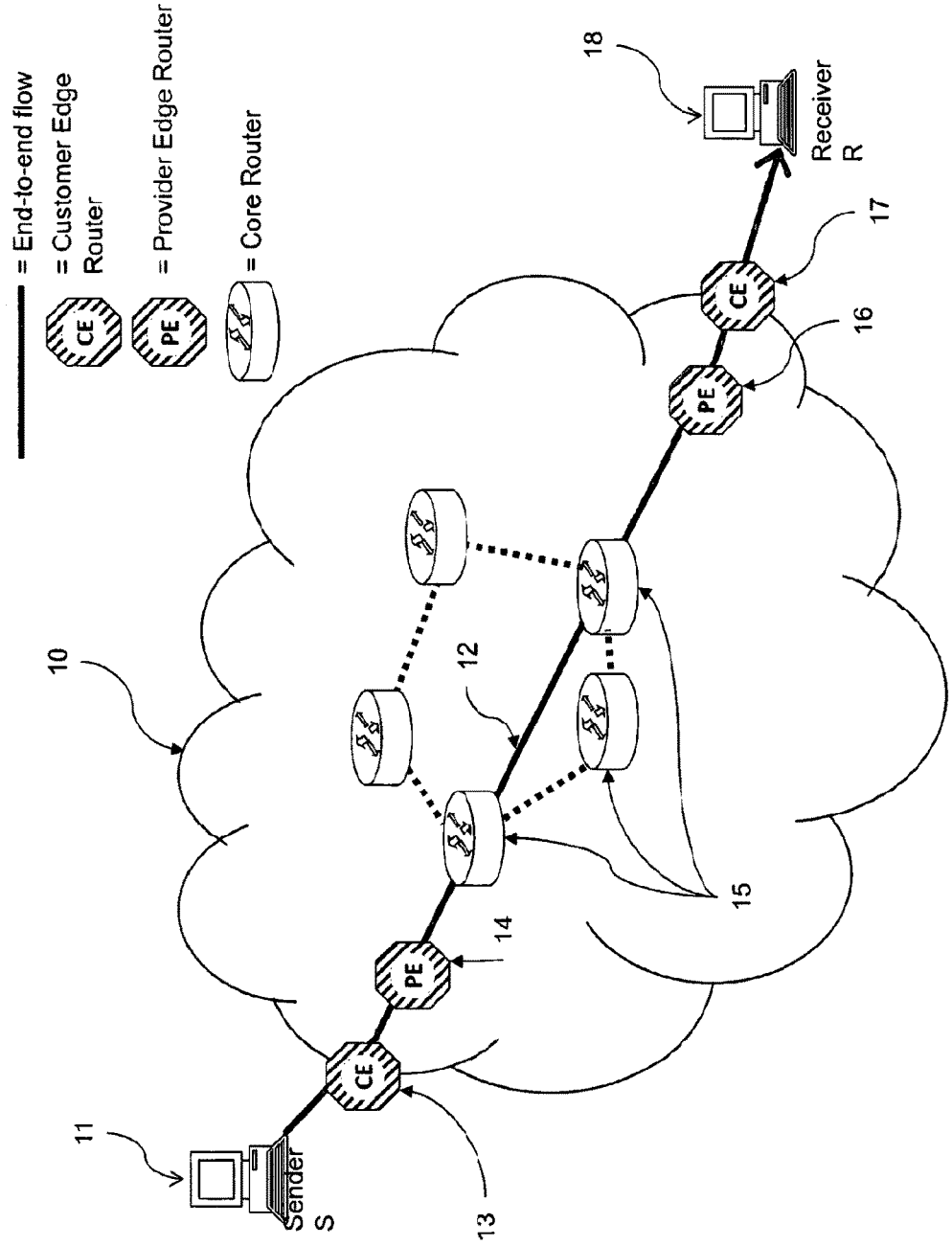
Figure 1 - Schematic of a Typical Network

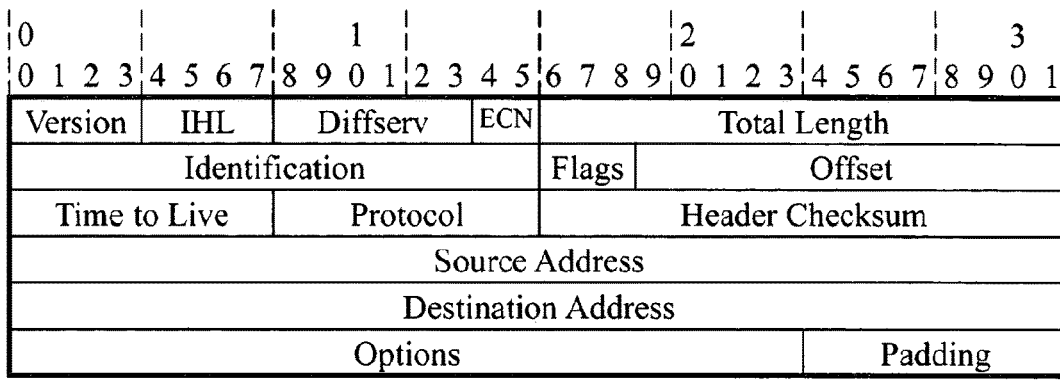
Figure 2 - IPv4 header
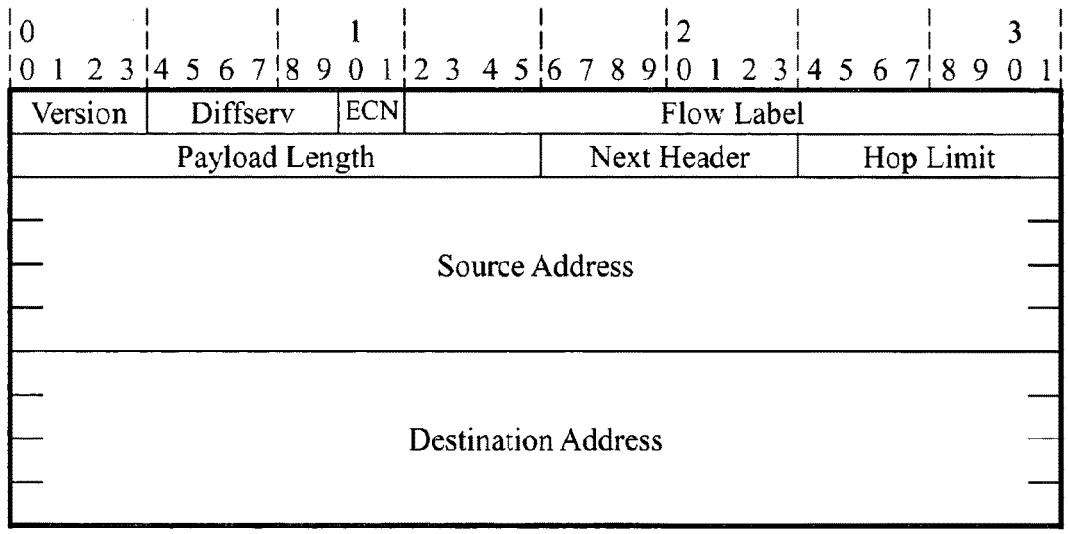
Figure 3 – IPv6 header
| Codepoint meaning | Codepoint name | ECN field | |
|---|---|---|---|
| Not ECN-capable transport | Not-ECT | 0 | 0 |
| ECN-capable transport | ECT(1) | 0 | 1 |
| ECN-capable transport | ECT(0) | 1 | 0 |
| Congestion Experienced | CE | 1 | 1 |
Figure 4– Definition of the Explicit Congestion Notification (ECN) field in either IPv4 or IPv6

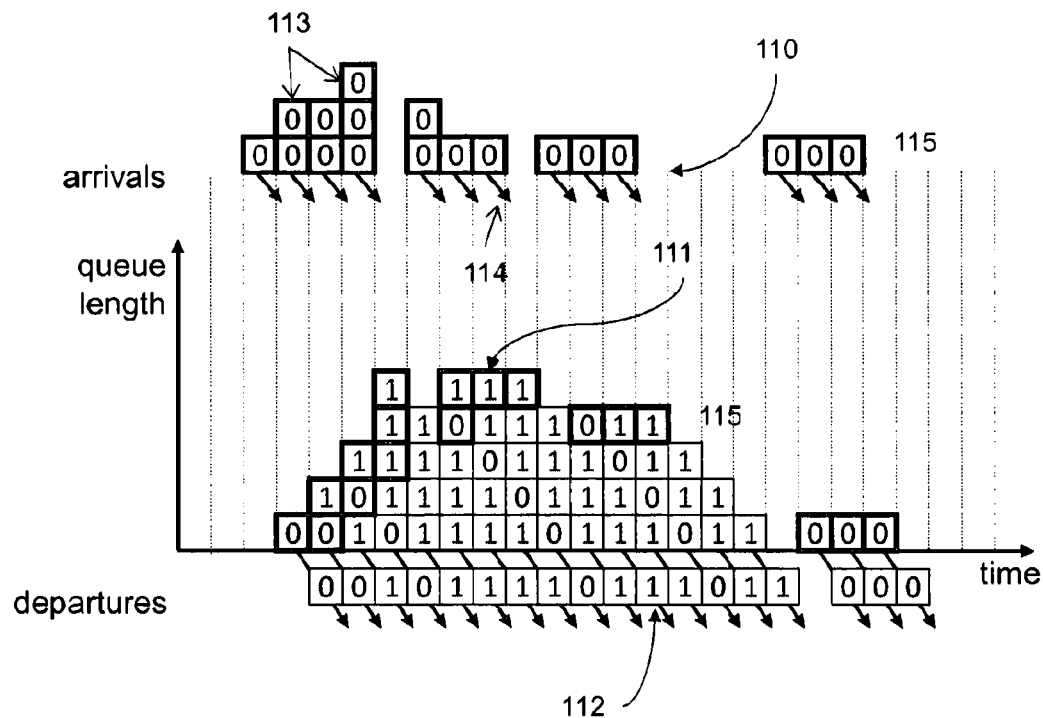
Figure 5– The Unqueuable ECN Marking Process as Queue Length Evolves

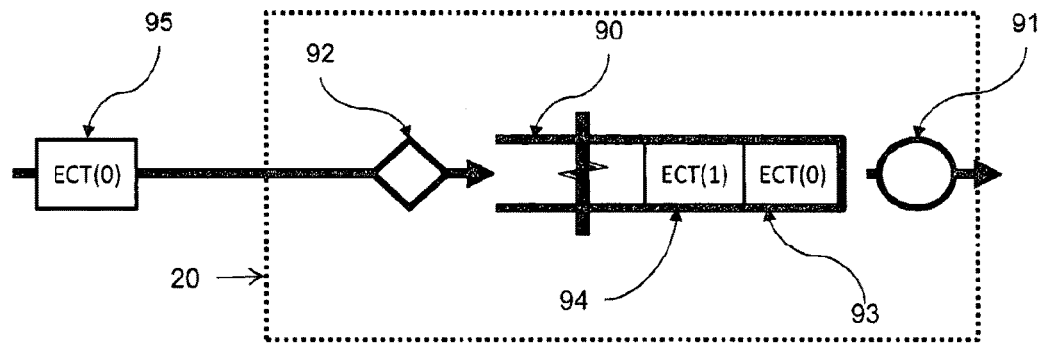
Figure 6– A Buffer with a single-Unmarked-Packet Queue
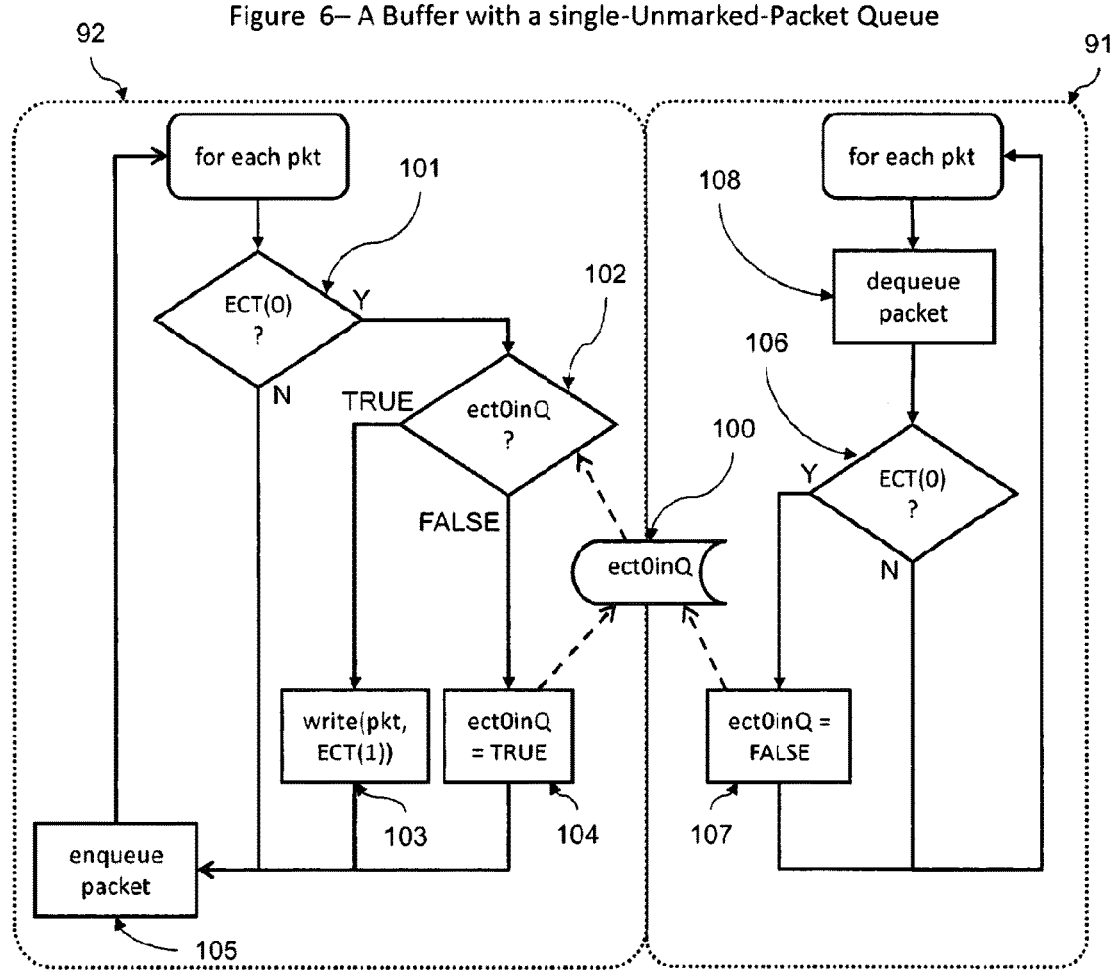
Figure 7 – Flow Diagram showing the Relevant Parts of the Enqueuing and Dequeuing Algorithms of the Unqueuable ECN Marking Algorithm

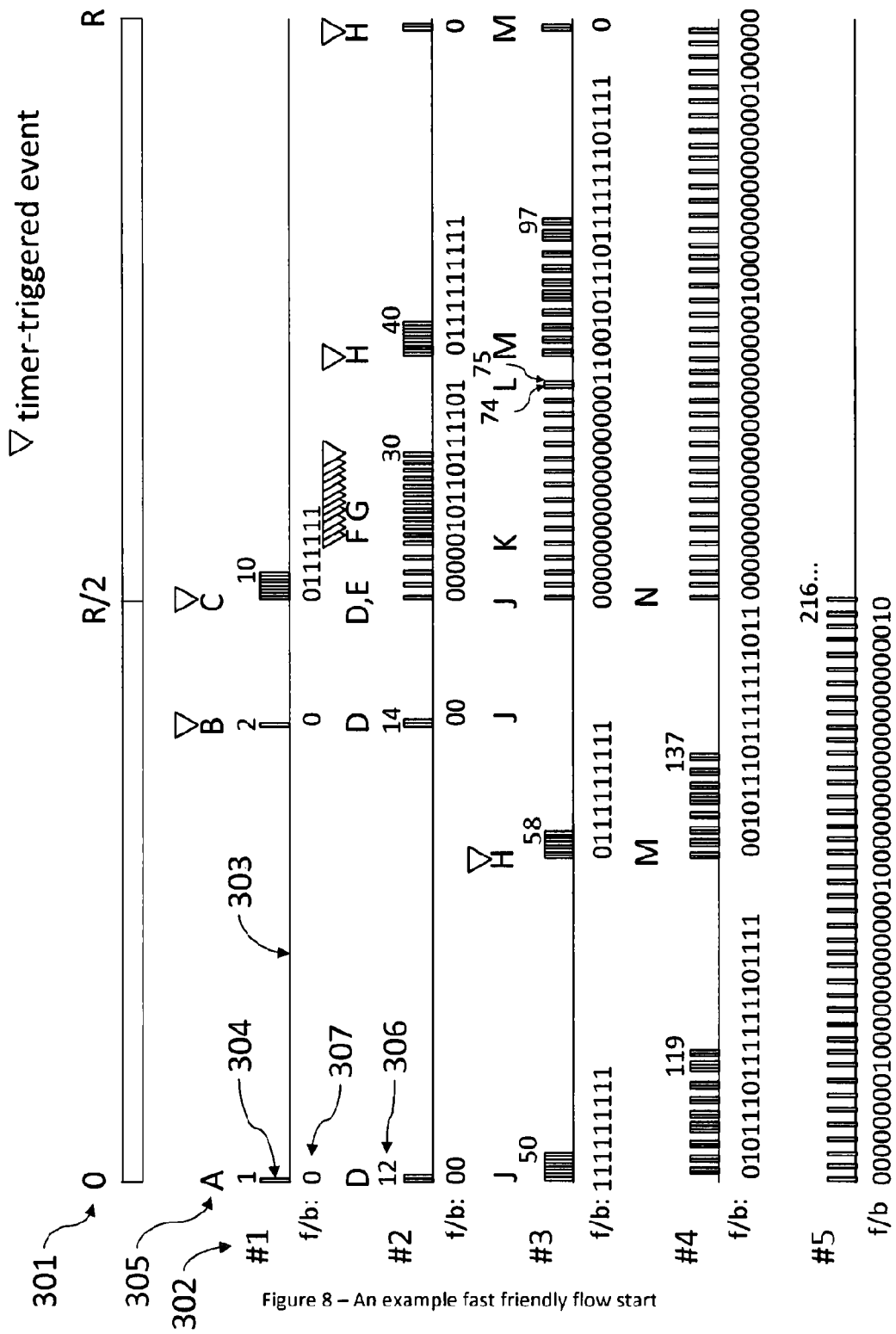
Figure 8 – An example fast friendly flow start

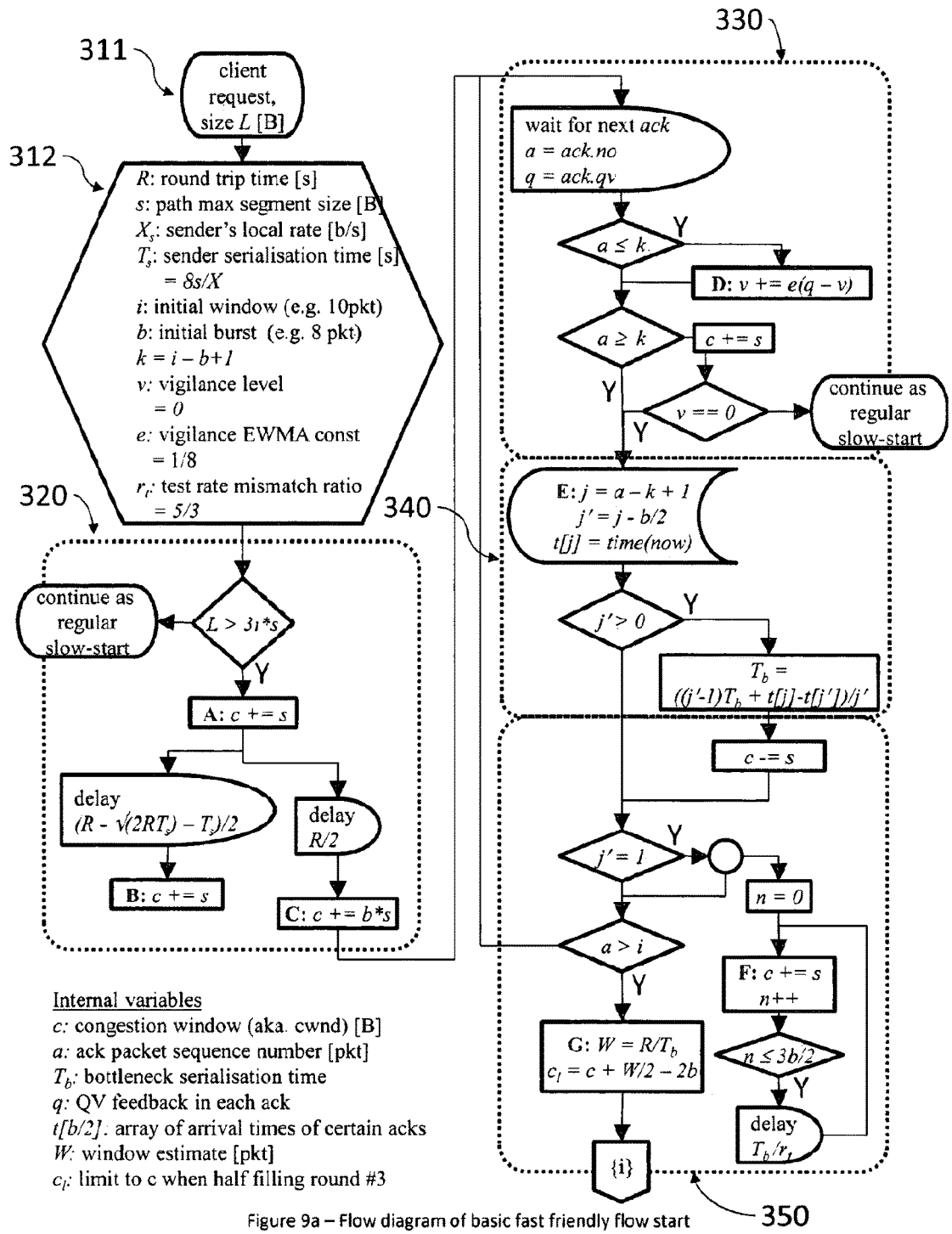
Figure 9a – Flow diagram of basic fast friendly flow start

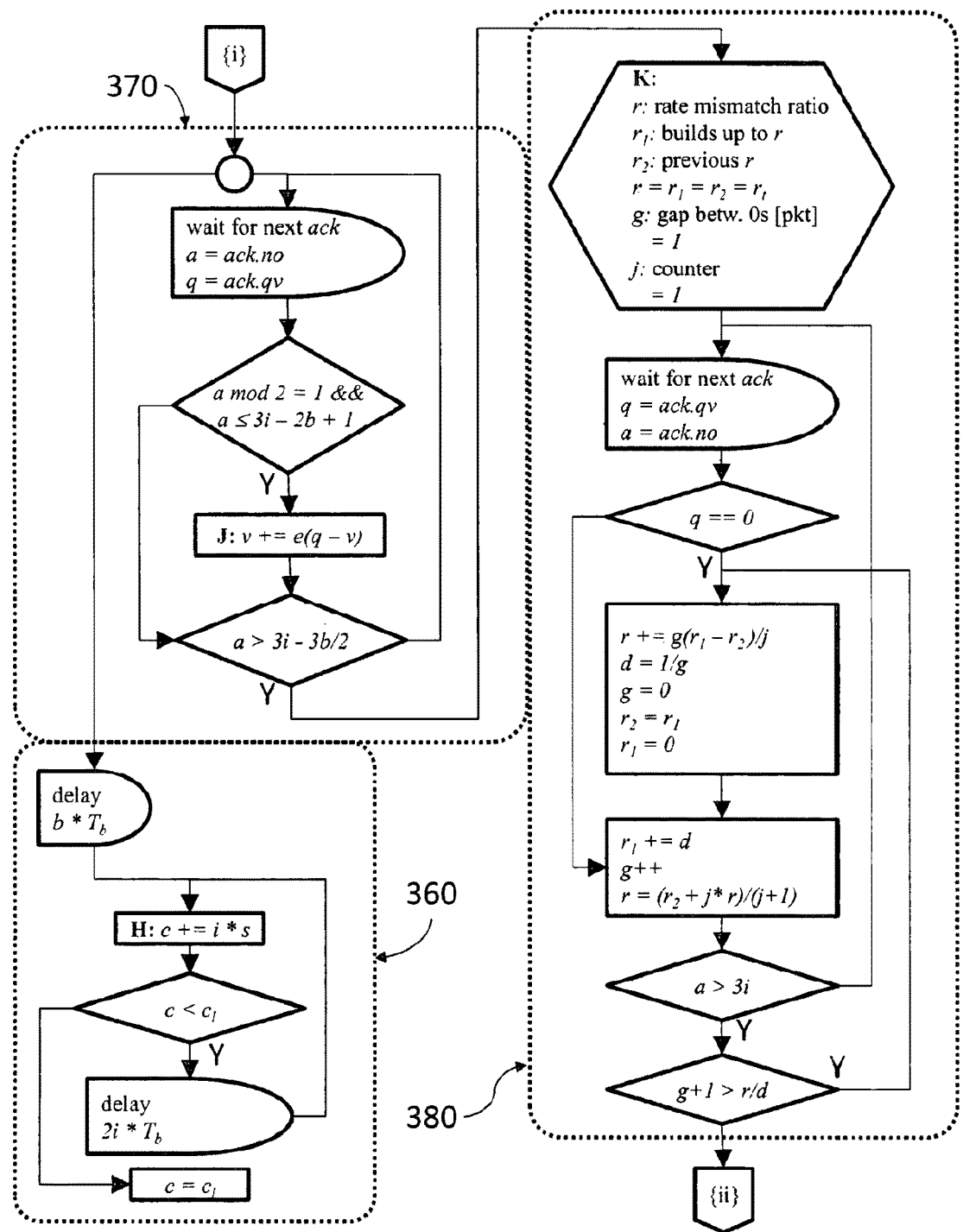
Figure 9b – Flow diagram of basic fast friendly flow start

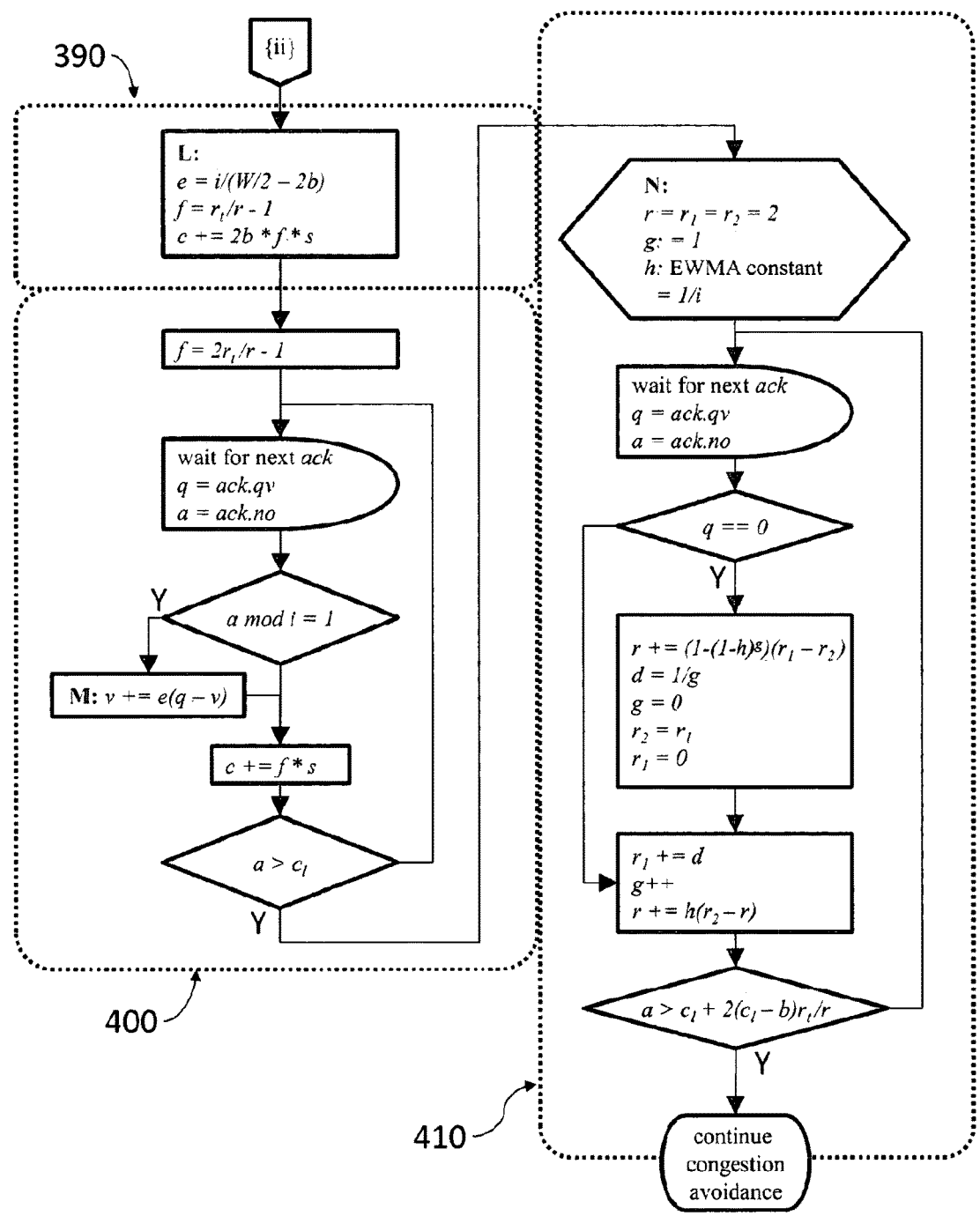
Figure 9c – Flow diagram of basic fast friendly flow start

FAST FRIENDLY START FOR A DATA FLOW

This application is the U.S. national phase of International Application No. PCT/GB2014/000300 filed 31 Jul. 2014, which designated the U.S. and claims priority to GB Patent Application No. 1313760.9 filed 31 Jul. 2013, the entire contents of each of which are hereby incorporated by reference.

FIELD OF INVENTION

The present invention describes a way for a packet data flow to use markings on packets that indicate the longest instantaneous queue length on the path in order to rapidly increase the flow rate up to the available capacity without overshoot, rather than the traditional approach of probing for capacity by starting at a low rate and doubling every round-trip until overshoot is detected. Specifically it relates to a method and apparatus for transmission rate adaptation based on the indicated queue length.

BACKGROUND TO THE INVENTION

A data source faces a dilemma whenever it has little or no information about how much capacity is available, but it needs to send data as fast as possible without causing undue congestion. A data source faces this dilemma every time it starts a new data flow, every time it re-starts after an idle period, and every time another flow finishes that has been sharing the same capacity.

The family of congestion control algorithms that have been proposed for TCP combine two forms of operation: one dependent on congestion feedback (closed-loop control), the other at times when there is no feedback (open-loop control). On the current Internet, open loop control has to be used at the start or re-start of a flow or at the end of a competing flow, when the sender has little or no information on how much capacity is available.

For instance, a large majority of TCP algorithms uses the same 'slow-start' algorithm to exponentially increase the sending rate, probing for more capacity by doubling the sending rate every round trip, until the receiver feeds back that it has detected a loss as the first signal of congestion. The sender receives this feedback one round trip time after its sending rate exceeded available capacity. By the time it receives this signal it will already be sending more than twice as fast as the available capacity.

A concept called the congestion window is used within the TCP algorithm to control its rate. The window is the amount of data that can be sent in excess of the data that has been acknowledged. With little or no knowledge of the available capacity (open-loop) it is difficult to argue whether one congestion window is better than another—any behaviour could be safe in some circumstances and unsafe in others. Internet standards say a flow should start with a window of no more than 4380 B (3 full-sized packets over Ethernet), and a window of 10 packets is currently being experimented with. Numbers like these are set by convention to control a flow's behaviour while it has no better information about actual available capacity (open-loop control). Similarly, there is no particular reason why TCP doubles its window every round trip during its start-up phase. Doubling certainly matches the halving that another part of the TCP algorithm does during its closed-loop (or 'congestion avoidance') phase. However, the choice of the number two for doubling and halving was fairly arbitrary.

This doubling does not always interact well with non-TCP traffic. Consider the case of a low-rate (e.g. 64 kb/s) constant-bit-rate voice flow in progress over an otherwise empty 1 Gb/s link. Further imagine that a large TCP flow starts on the same link with an initial congestion window of ten 1500 B packets and a round trip time of 200 ms. To discover how much capacity is available, the flow keeps doubling its window every round trip until, after nearly eleven round trips, its window is 16,667 packets per round (1 Gb/s), and at some point during the twelfth round trip it will have filled the buffer of the 1 Gb/s link too. We will assume the buffer has been sized to take a full window of packets (16,667) therefore it will take another round for the sender to fill the buffer at which point its window will have grown to 33,333 packets (2 Gb/s). One round later, it will get the first feedback detecting drops that will imply that a round trip earlier it exceeded both available capacity and the buffer, so the sender will halve its window. However, just before that point its window would have been 66,667 packets, representing four times the link rate or 4 Gb/s. About 50% of the packets in this next round (33,333 packets) will be dropped. This huge loss of packets is the best case scenario if the buffer is correctly sized for a single flow. Even if the buffer were sized for multiple flows (say 25), 20,000 packets would still have to be discarded ($16,667*(1+1/\sqrt{25})=20,000$).

In this example TCP has already taken 12 round trip times, over 2 seconds in this case, to find its correct operating rate. Further, when TCP drops such a large number of packets, it can take a long time to recover, sometimes leading to a black-out of many more seconds (100 seconds has been reported [Ha08] due to long time-outs or the time it takes for the host to free-up large numbers of buffers). In the process, the voice flow is also likely to black-out for at least 200 ms and often much longer, due to at least 50% of the voice packets being dropped over this period.

This shows there are two problems during flow-startup: i) a long time before a flow stabilises on the correct rate for the available capacity and ii) a very large amount of loss damage to itself and to other flows before a newly starting flow discovers it has increased its rate beyond the available capacity (overshoot).

These problems do not only arise when a new flow starts up. A very similar situation occurs when a flow has been idle for a time, then re-starts. When a flow restarts after idling, it is not sufficient for it to remember what the available capacity was when it was last active, because in the meantime other traffic might have started to use the same capacity, or flows that were using the same capacity might have finished, leaving much more available capacity than earlier.

These problems do not even only arise when a flow starts or restarts. If two flows are sharing the same capacity they will continually slowly try to use more capacity, deliberately causing regular buffer overflows and losses. When either flow detects a loss, it responds by slowing down. The outcome of all the increases and all the decreases leads each flow to consume a proportion of the capacity on average. However, when one flow finishes, the other flow is never told explicitly that more capacity is available. It merely continues to increase slowly for what can be a very long time before it eventually consumes all the capacity the other flow freed up.

Recently, new TCP algorithms such as Cubic TCP have been designed that seek out newly available capacity more quickly. However, the faster they find new capacity, the more they overshoot between reaching the new limit of available capacity and detecting that they have reached it a round trip later.

As the capacity of Internet links increases, and the bit-rates that flows use increase, this open-loop control dilemma between increasing too slowly and overshooting too much gets progressively more serious.

A number of different methods for signalling congestion in packet networks i.e. that queues are building up, are known in the prior art, for example active queue management (AQM) techniques (e.g. RED, REM, PI, PIE, CoDel) can be configured to drop a proportion of packets when it is detected that a queue is starting to grow but before the queue is full. All AQM algorithms drop more packets as the queue grows longer.

An active queue management algorithm can be arranged to discard a greater proportion of traffic marked with a lower class-of-service, or marked as out-of-contract. For instance, weighted random early detection [WRED] determines whether to drop an arriving packet using the RED AQM algorithm but the parameters used for the algorithm depend on the class of service marked on each arriving packet.

Explicit Congestion Notification (ECN) [RFC3168] conveys congestion signals in TCP/IP networks by means of a two-bit ECN field in the IP header, whether in IPv4 (FIG. 2) or IPv6 (FIG. 3). Prior to the introduction of ECN, these two bits were present in both types of IP header, but always set to zero. Therefore, if these bits are both zero, a queue management process assumes that the packet comes from a transport protocol on the end-systems that will not understand the ECN protocol so it only uses drop, not ECN, to signal congestion.

The meaning of all four combinations of the two ECN bits in IPv4 or IPv6 is shown in FIG. 4. If either bit is one, it tells a queue management process that the packet has come from an ECN-capable transport (ECT), i.e. both the sender and receiver understand ECN marking, as well as drop, as a signal of congestion.

When a queue management process detects congestion, for packets with a non-zero ECN field, it sets the ECN field to the Congestion Experienced (CE) codepoint. On receipt of such a marked packet, a TCP receiver sets the Echo Congestion Experienced (ECE) flag in the TCP header of packets it sends to acknowledge the data packets it has received. A standard TCP source interprets ECE feedback as if the packet has been dropped, at least for the purpose of its rate control. But of course, it does not have to retransmit the ECN marked packet.

Drop and congestion signals are not mutually exclusive signals, and flows that enable ECN have the potential to detect and respond to both signals.

The ECN standard [RFC3168] deliberately assigns the same meaning to both the ECN codepoints with One bit set (01 and 10). They both mean that the transport is ECN-capable (ECT), and if they need to be distinguished they are termed ECT(1) and ECT(0) respectively. The intention was to allow scope for innovative new ways to distinguish between these fields to be proposed in future.

A number of authors have proposed techniques to mitigate the dilemma between starting a data flow fast and overshooting. This research has mostly remained relatively obscure either because it improves only one half of the dilemma at the expense of the other, or because the proposals have been considered impractical to deploy. Also, most researchers have focused on the closed-loop phase of congestion control, perhaps being unaware that the open-loop phase is becoming the dominant problem as rates increase. The proposals fall into two groups i) those that propose to solely change end-systems and ii) those that propose to change both end-systems and queuing algorithms.

Paced Start [Hu03] proposes to solely change the sender, to monitor the queuing delay that a buffer adds between packets when sent in trains during TCP slow-start. Then it paces the packets sent in subsequent rounds. This avoids TCP's overshoot, but it takes even longer than TCP's slow-start to reach the available capacity.

Hybrid slow-start [Ha08] keeps TCP's slow-start algorithm unchanged but the sender attempts to stop doubling the congestion window at the point it will start to overshoot, rather than a round trip time after it has overshot. It does this by monitoring increases in the delays between the early acknowledgements in each round, and by monitoring when the duration of each whole acknowledgement train approaches the round-trip time. Although hybrid slow-start was deployed in Linux, it is typically turned off because it seems to reduce performance more often than it improves it. This is because sometimes it ends the start-up phase too early and then takes a long time to reach the available capacity.

CapStart [Cav09] uses packet-pair delay measurements similarly to HSS in order to end slow-start early (limited slow-start). However it makes great gains by reverting to classic slow-start if it measures that the bottleneck is probably at the sender not in the network, in which case there will be no large loss episode to avoid. The experimentation with CapStart confined itself to scenarios with no cross-traffic, in order to remain tractable.

Liu et al [Liu07] investigated what the impact would be if every flow simply sent all its data paced out over the first round trip time (termed Jump Start). If acknowledgements report losses or if the first acknowledgement returns while there is still data to send, the algorithm moves into TCP's standard retransmission and congestion avoidance behaviour. The authors monitored current Internet flows and found that only about 7.4% of them comprise more than the three packets that a sender would send immediately anyway under the existing standard behaviour. The paper is inconclusive on whether the edges of the Internet would cope with the very high loss rates that this 7.4% of flows would cause (because they represent a very much larger proportion of the bytes on the Internet).

Although [Liu07] is primarily about a change to the sender only, it mentions that senders could mark any packets in excess of the three allowed in the first round as eligible for preferential discard by switches and routers. This would protect competing flows from any overshoot, but it would require preferential discard to be enabled at all potential bottleneck buffers. The rest of the schemes described below also require both end-systems and network buffers to be modified.

Fast-Start [Padman98] uses a possibly stale congestion window from previous connections during start-up. However, to compensate, it sends packets with higher drop priority (i.e. more likely to be dropped). It also improves TCP's handling of losses to cope with the higher loss-probability. Higher drop probability is defined as follows: "The router implements a simple packet drop priority mechanism. It distinguishes between packets based on a 1-bit priority field. When its buffer fills up and it needs to drop a packet, it picks a low-priority packet, if available, first. Since fast start packets are assigned a low priority, this algorithm ensures that an over-aggressive fast start does not cause (non-fast start) packets of other connections to be dropped."

TCP-Peach [Akyildiz01] also uses probe packets that are marked to be treated by the network with lower priority in order to detect spare capacity in a satellite network context.

Quick-start involves a modification to TCP for the sender to explicitly ask all routers on the path what bit-rate it should start at. Quick-start will not work well unless every router has been upgraded to participate in the signalling. Also Quick-start doesn't have a way to signal to lower-layer switches that are not IP-aware and it requires that all sources are trusted by the network to subsequently send at the rate the network asks them to send at.

U.S. Pat. No. 7,680,038 (Gourlay) discloses a method for optimizing bandwidth usage while controlling latency. Gourlay teaches switching between a "probe mode" and a "steady mode". In the probing mode a bandwidth estimation module determines the available bandwidth for a connection by sending "bursts" of packets and ramp up, or increase, the available bandwidth until an acknowledgment packet indicating a loss of a packet is received, and for the next burst the available bandwidth is decreased. After an estimated available bandwidth is determined data is sent out at a fraction of the estimated available bandwidth.

There are some known alternative uses for the two ECN-capable transport (ECT) codepoints.

One idea has been to use the ECT(1) value to signal an intermediate level of congestion between uncongested (ECT (0)) and congested (CE). This idea has been standardised in one variant of an approach termed pre-congestion notification (PCN [RFC5670]). PCN uses a virtual queue, which is not actually a queue; rather it is a number that represents the length of queue that would have formed if the buffer were drained more slowly than the real buffer drains. One variant of PCN uses two virtual queues one configured to drain at a slower rate than the other. When the slower virtual queue fills, it marks packets with the ECT(1) codepoint and when the faster virtual queue fills it marks packets with the CE codepoint. The PCN approach is not standardised to be used as a signal to end-systems, only within the network however, virtual queues have been used to signal to end-system algorithms, e.g. High Utilisation Ultra Low Latency (HULL) [Alizadeh12].

In "Single PCN threshold marking by using PCN baseline encoding for both admission and termination controls", appendix D, by D. Satoh et al [1], a mechanism is described for marking the proportion of packets that represents the instantaneous utilisation of a logical link. Utilisation of the logical link is signalled by marking the ECN field of every packet that arrives when the virtual queue is non-empty. The proportion of bits in marked packets relative to all bits then represents instantaneous utilisation, but the representation is only precise for a Poisson distribution of inter-arrival times. Again the technique in Satoh et al was proposed in the context of admission control signalling, but it would be used in a similar way to HULL by end-systems for congestion control.

There have been other proposals from the research community for a network node to signal an early warning of impending congestion to end-systems as well signalling actual queue growth; in order to address the open-loop control problem at the start of a new data flow. For instance VCP in "One more bit is enough" by Yong Xia et at [2], uses the ECT(1) codepoint of the ECN field to signal when utilisation of a link has exceeded a set threshold, in a similar way to PCN.

In "AntiECN Marking: A Marking Scheme for High Bandwidth Delay Connections", S. Kunniyur [3], each packet carries a bit called the Anti-ECN bit in its header. The bit is initially set to zero. Each router along the packet's route checks to see if it can allow the flow to increase its sending rate by determining whether the packet has arrived at an empty virtual queue. If so, the router sets the bit to one. If on arrival the virtual queue is non-empty, it sets the bit to zero. The receiver then echoes the bit back to the sender using the ACK packet. If the bit is set to one, the sender increases its congestion window and hence its rate.

SUMMARY OF INVENTION

According to a first aspect of the invention there is provided a method for initialising a flow of packets between a source node and a node along a path in a network, comprising at the source node: sending one or more initial burst of packets over a round-trip at a chosen rate;
receiving from the network node a sequence of feedback packets, said sequence indicating a queue length at the network node at the arrival of a packet from the initial burst or bursts of packets;
estimating from the sequence a mismatch between the chosen rate and a rate available at the network node; and
sending a further burst of packets using a fraction of said initially chosen rate.

This has the advantage that the source node can send out packets at a much quicker pace than compared to using the TCP Slow start process and hence reach the full available capacity much quicker.

Preferably, spacing between the packets is varied over the round-trip.

According to a second aspect of the present invention there is provided a source node arranged in operation to determine a mismatch ratio between a rate at which the source node is configured to send packets to one or more nodes along a path in a network and the available capacity of at least one of said nodes, said source node comprising:
a receiving module arranged to receive a sequence of tag status values associated with packets which have been routed via one or more of said other nodes, wherein at least one of said nodes is arranged in operation to indicate its queue length by, upon receiving a packet carrying a status tag set to a first status value, to check if any packet already in a queue at the time of arrival of said packet has upon leaving the queue a status tag set to said first status value; and if so to change the tag status value of the received packet to a different status value;
a module arranged to determine the spacing between a received packet having a tag status set to said first status value and the previously received packet having a tag status set to said first status value; and
a calculation module arranged to calculate said mismatch ratio by dividing the determined spacing by the most recent, previously determined spacing.

By calculating a mismatch ratio it is possible to avoid congestion, i.e. to keep a flow filling capacity while only having to pulse the rate to the point where it induces a one-packet queue rather that pulsing the rate to the point where it fills a buffer sufficiently to trigger a congestion signal.

According to a third aspect of the invention there is provided method for distinguishing between transmission losses and congestion losses in a packet network comprising:
receiving at a source node a sequence of tag status values associated with packets which have been routed via one or more other nodes in a network, wherein at least one of said other nodes is arranged in operation to indicate its queue length by the spacing between packets associated with a first tag status value;
detecting a loss of packets;

determining from said sequence of tag status values a first spacing between a pair of packets having said first tag status value, which packets were received before said loss, and optionally a second spacing between a pairs of packets having said first tag status value, which packets were received after said loss;

determining from said spacing or spacings the length of the queue before the loss and optionally the length of the queue after the loss; and if the length of each queue is less than a defined number of packets categorising the loss as a transmission loss.

By distinguishing between transmission losses and congestion losses the sender node does not have to unnecessary reduce its sending rate if the loss is a transmission loss.

BRIEF DESCRIPTION OF THE DRAWINGS

Embodiments of the invention will now be described, by way of example, with reference to the accompanying drawings in which:

FIG. 1 shows a schematic diagram of a typical packet network.

FIG. 2 shows an IPv4 packet header.

FIG. 3 shows an IPv6 packet header.

FIG. 4 shows the current definition of the Explicit Congestion Notification (ECN) field in either IPv4 or IPv6.

FIG. 5 shows an exemplary diagram of the unqueueable ECN marking process as queue length evolves.

FIG. 6 shows a buffer with a single unmarked packet queue.

FIG. 7 shows a flow diagram of the relevant parts of the enqueuing and dequeueing algorithms of the unqueueable ECN marking algorithm.

FIG. 8 shows an example of a data sender using the information from unqueueable ECN marking to achieve a fast but friendly start to a data flow.

FIGS. 9a, 9b and 9c show three sequential parts of a flow diagram illustrating the logical steps in a general purpose but basic fast friendly flow start.

DETAILED DESCRIPTION OF INVENTION

FIG. 1 shows a schematic diagram of a typical packet network (10). A sender (11) sends data packets along path (12) towards receiver (18). A sequence of routers forward the data packets along the path. The sender forwards them to a customer edge (CE) router, or source node, (13), which in turn forwards them to a provider edge (PE) router (14). Other senders (not shown) will typically be connected to the CE router and other CE routers (not shown) will typically be connected to the PE router. The PE router forwards the data packets to a core router, which in turn may forward them via one or more core routers towards a second PE router (16), which forwards them to the receiver via another CE router (17). It will be understood that the path from a sender to a receiver may pass through different numbers of routers to those depicted in FIG. 1.

Each router comprises a processor, a memory, a store for storing program modules and at least one buffer (20) for each outgoing interface. FIG. 6 depicts one of these buffers with a few packets (93, 94) which have arrived in a certain order. In practice selected information from the packet headers may be buffered separately from the actual packets, but only a single buffer is shown for simplicity. In prior classifying and scheduling stages, the router may have determined which packets to queue in this buffer. The buffer and its management consists of a packet store (90), a dequeuing function module (91) that forwards packets to the line and an enqueuing function module (92) that enqueues arriving data packets.

The enqueuing and dequeuing function modules may be implemented on the same network interface card. Alternatively, in a distributed machine architecture they may be implemented on separate cards while sharing access to common control information about the distributed buffer memory. In such a case the components of the buffer (20) will be associated together logically rather than physically.

Although the term 'router' has been used for all the network nodes, this is not intended to preclude non-IP-aware nodes, e.g. Ethernet switches or MPLS switches, from implementing the invention in their buffers. Similarly, it does not preclude functions with a buffer but no routing or switching from implementing the invention, e.g. end-systems, firewalls or network address translators.

The unqueueable ECN marking approach will first be described with the aid of FIG. 5 for the simplest case of a single bottleneck queue in which all arriving packets are the same size and come from data sources that are all ECN-capable. A bottleneck node or link can be defined as the node or link on the path with the most constricted available capacity, given its underlying capacity, and the presence of competing traffic using it.

FIG. 5 shows in a graph the queue length as a function of time for arriving/departing packets (113). Time is divided into timeslots (110) along the horizontal axis, with packets (113) illustrated as little rectangles. During each timeslot one packet is forwarded by the dequeueing function module (91) from the buffer to the line, represented by the stream (112) of single packets leaving the system in the direction of the diagonal arrows from under the horizontal axis. There is intention to imply that in practice the router operates in discrete timeslotted steps the size of individual packets; this is merely a way to simplify explanation of the process. Zero, one or more packets (113) may arrive during a timeslot (110), represented by the stack of arriving packets shown along the top of the diagram, with diagonal arrows (114) showing that the whole arriving stack of packets joins the queue during the next timeslot (110). The length of the queue in each timeslot is shown by the height of the stack of packets in the body of the graph. The packets that have just been added into the queue within the current timeslot are shown with thicker borders.

The character (115)(or lack of character) within each packet (113) in FIG. 5 represents the value of the ECN codepoint in that packet, using the abbreviated forms in the legend at the bottom of the figure. In this initial simple case, all arriving packets come from senders that have set the ECN field to ECT(0), which is the standard ECN behaviour.

The choice of these particular codepoints to encode queue length signals is not intended to preclude other similar encodings. It is merely used to illustrate a concrete example of the invention that has been designed to be possible to deploy incrementally in the current Internet. Other encodings are equally valid, particularly where constraints of deployment do not apply.

When a packet arrives with the ECT(0) codepoint, the enqueuing algorithm only allows it to keep the ECT(0) marking if there are no other packets in the queue with the ECT(0) marking. In the case of the packet labelled (111), there is an ECT(0) packet already in the middle of the queue. Therefore, the newly arriving packet is re-marked to the ECT(1) codepoint. As time progresses one packet leaves the queue in each timeslot, therefore any packet appears to progress diagonally down and to the right of the graph, until it leaves the queue in the stream (112).

Once an unmarked packet (ECT(0)) leaves the queue, the next packet to arrive can be left unmarked. This is why diagonal stripes of zeroes can be seen in FIG. 5, spaced apart by the length of the queue when the new ECT(0) packet arrived. Therefore the spacing between ECT(0) packets in the stream of packets (112) leaving the queue represents the length of the queue at the time the later ECT(0) packet originally arrived.

This spacing can be measured in packets, in bytes or in time. In a more realistic scenario, arriving packets would be different sizes. The packet marking process would be no different to that already described, in that each arriving packet will still be re-marked to the ECT(1) codepoint if there were a packet marked ECT(0) already in the queue. As packets leave the buffer, the number of transmitted bytes between the start of one ECT(0) packet and the start of the previous ECT(0) packet would then represent the length of the queue in bytes at the instant that the second of the two packets arrived. Similarly, the duration between one ECT(0) packet starting to be dequeued and the previous ECT(0) packet starting to be dequeued would represent the queuing delay experienced by the second ECT(0) packet.

One way to implement the unqueueable ECN marking algorithm is described in the following using pseudocode and the diagrams in FIGS. 6 and 7. An alternative algorithm is also described later, nonetheless it should be understood that these two example algorithms do not preclude other similar ways of achieving the same outcome.

The algorithm consists of two functions that are part of the enqueue module (92) and the dequeue (91) module. The two functions share a binary variable ect0inQ (100) used to communicate between the two, that is set as TRUE if there is a packet carrying the ECT(0) codepoint in the queue. It is initialised as follows.

Boolean ect0inQ=FALSE

FIG. 6 illustrates the packet store (90) already containing two packets, the first (93) with the ECT(0) marking and the second (94) with the ECT(1) marking.

As each arriving packet is enqueued, the following algorithm within the enqueue function module (92) allows no more than one packet in the queue with an ECN field of ECT(0):

```
enqueue(packet) {
    foreach packet {
        if (read_ECN(packet) == ECT0) {
            if (ect0inQ) {
                write(packet, ECT1)
            } else {
                ect0inQ = TRUE
            }
        }
        % code to enqueue the packet here
    }
}
```

As each packet is dequeued, the following algorithm is run to maintain the ect0inQ variable that tracks whether there is a packet in the queue marked ECT(0):

```
dequeue(packet) {
    foreach packet {
        % code to dequeue the packet here
        if (read_ECN(packet) == ECT0) {
            ect0inQ = FALSE
        }
    }
}
```

As an example, consider that the queue was empty when the first packet (93) arrived at the enqueuing function module (92) carrying the ECT(0) marking. At stage (101) only packets that arrive carrying the ECT(0) marking are passed to the unqueueable ECN marking algorithm. This packet does so it passes to stage (102) which tests the shared variable ect0inQ. This will have been set to FALSE either by the initialisation step above, or by an earlier execution of the dequeue loop when the last ECT(0) packet left the queue. Therefore, execution passes to stage (104) where the ECT(0) codepoint is left unchanged and ect0inQ is set to TRUE to reflect the fact that the single ECT(0) packet permitted in the queue is now present. Then execution passes to stage (105) where the usual enqueuing machinery is executed to add the packet to the buffer's memory structure.

As a different example, consider the third packet (95) to arrive at the enqueuing function module (92) carrying the ECT(0) marking, while the first packet has still not been completely forwarded to the line. At stage (101) the newly arriving packet is tested for whether it carries the ECT(0) marking, which it does so it passes to stage (102) which tests the shared variable ect0inQ. Because the ECT(0) packet (93) is still sitting at the head of the queue, ect0inQ is still TRUE. So this time execution passes to stage (103) where the ECN field is re-marked to ECT(1). Then execution again passes to stage (105) where the usual enqueuing machinery is executed to add the packet to the buffer's memory structure.

When packet (93) has finally finished being forwarded to the line through the normal dequeuing processes (108), the module of the dequeue function (91) is called that manages unqueueable ECN marking. If the packet that is about to finish being dequeued carries the ECT(0) marking, as packet (93) does, stage (106) passes execution to stage (107) that sets the shared ect0inQ flag to FALSE, indicating that there is no longer an ECT(0) packet in the queue. This will allow a new ECT(0) packet into the queue by the next execution of stage (102) in the enqueuing function, because it will pass to stage (104) not (103), as has already been explained.

If, on the other hand, the packet that is about to finish being dequeued after stage (108) does not carry the ECT(0) marking, then stage (106) will do nothing other than pass execution straight back to the outer dequeue function to process the next packet.

This algorithm design is an example of known mutual exclusion algorithms such that the implementations of the enqueue (92) and dequeue (91) parts can be executed on independent parallel processors, because there is no possibility that any order of events or race conditions can ever allow two ECT(0) packets into the queue at the same time.

As has been pointed out with reference to FIG. 5, the spacing between unmarked (ECT(0)) packets in the outgoing packet stream (112) represents the queue length at the instant the later ECT(0) packet arrived at the queue. Referring to FIG. 1, for the data sender (11) to be able to continuously monitor the queue length, the receiving node (18) must feed back to the sender (11) an encoding of how many of each type of ECN codepoint it has received in a data flow.

Alternatively the receiving node may determine this spacing itself, and continually derive the queue length. Then the receiving node may continually feed a value representing this queue length back to the sender, or the receiving node may even determine a new rate for the sender to use and feed a value representing this rate back to the sender.

Nonetheless, it will be most straightforward for the receiver to simply reflect an encoding of the values of the ECN field that it receives, because this feedback is already provided by newer end-to-end transport protocols, and it is being added to older ones such as TCP.

Specifically, a proposal entitled "More Accurate ECN Feedback in TCP" by M. Kühlewind and R. Scheffenegger [4] is before the Internet Engineering Task Force (IETF), for the TCP protocol to be modified so that the receiving node (18 in FIG. 1) feeds back to the sender (11) indications of how many of each type of ECN codepoint it has received in a data flow. Other more recent end-to-end transport protocols already provide for sufficient ECN feedback information, for example the base datagram congestion control protocol (DCCP [RFC4340]) and the recent modification to the real-time control protocol (RTCP) to add ECN capabilities [RFC6679].

Nonetheless, all the packets passing through the buffer into a link in the network need not originate at the same sender. For instance, referring to FIG. 1, although sender (11) is connected to the link between the CE router (13) and the (PE) router (14), other senders may also be connected to the CE router. Also, within sender (11), multiple independent processes may be sending data through this link. Therefore the packets in FIG. 5 may be divided into subsets, each belonging to different data flows between different sending and receiving processes.

It will now be shown that on average the unqueueable ECN marking scheme signals the queue length into each of these independent data flows, so that it is not merely useful when one data flow is alone on the link. The average measurement becomes more precise the more packets there are in any one data flow, so that short flows receive a rough estimate of the queue length, while larger flows develop a more accurate view of the evolving queue length. This is sufficiently useful, because a short flow can do limited damage to other flows if its estimate of the queue length is too large or too small, whereas a larger flow has the potential to cause much more harm to other flows if its measurement of queue length is significantly incorrect.

As an example, consider for simplicity that the queue of packets in FIG. 5 is a constant standing queue of 10 packets, so that every tenth packet in the stream departing from the buffer carries the ECT(0) codepoint while the every other nine carry ECT(1). Further consider that the stream of packets consists of two data flows, one that on average consumes 20% of the capacity of the link while the other consumes 80%. Assuming packets arrive randomly from each flow the first flow will pick up about 20% of the ECT(1) markings and 20% of the ECT(0) markings. Therefore, over a stream of 100 packets, as shown in the table below, on average 10 will carry ECT(0) and the first flow will see 20%×10=2 of them, while in total 90 will carry ECT(1) and the first flow will see 20%×90=18 of them. Therefore, on average, of the 20 packets in the first flow, 2 will carry ECT(0), so on average the first flow will correctly calculate that the queue is 20/2=10 packets long, even though it only receives 20% of the packets.

|           |      | ECT(0) 10% | ECT(1) 90% |
|-----------|------|------------|------------|
| All flows | 100% | 10         | 90         |
| Flow 1    | 20%  | 2          | 18         |
| Flow 2    | 80%  | 8          | 72         |

The unqueueable ECN marking scheme does not directly enable any one data source to determine its own contribution to the queue length as distinct from the total queue length. However, inference techniques would be possible to estimate this. For instance, by varying its own data rate and correlating its variation with changes in the aggregate queue length, a sender could determine the proportion of the queue that it was responsible for. Another possible heuristic would be to measure both the time and the number of its own bytes between ECT(0) codepoints. For instance, a queue of 10×1500 B packets into an 80 Mb/s line should drain in (10×1500*8)b/80 Mb/s=1.5 ms. If a data source knew (through some other mechanism) that its bottleneck link was 80 Mb/s, and if it measured that an ECT(0) packet appeared every ten 1500 B packets but the time between them was 7.5 ms not 1.5 ms, it could estimate that it was contributing to 1.5/7.5=20% of the queue.

In a further embodiment the Unqueueable ECN marking scheme is used in combination with the original ECN marking scheme. As already explained, the original standard ECN approach involves a congested buffer marking a proportion of ECN-capable packets with the congestion experienced (CE) codepoint, instead of dropping them, which it would do if the same packets were not ECN-capable.

Therefore, by a similar argument to that concerning multiple flows given above, the unqueueable ECN marking scheme and the original standard ECN approach [RFC3168] can both be deployed and simultaneously applied to the same ECN-capable packets. At one node, as it processes each packet, it would be preferable for the unqueueable ECN algorithm to be executed after the original standard ECN marking algorithm, because the outcome of unqueueable ECN marking depends on the ECN codepoint in the incoming packet, whereas the original standard ECN marking does not. This ordering would ensure faster convergence on a precise value for the queue length between the signals.

If, as recommended, the original standard ECN marking is applied before unqueueable ECN marking, the signal will represent the average length of the queue of ECN packets without counting CE packets. Given, the proportion of CE-marked packets is typically small and nearly always very small, the error in estimated queue length will typically be very small too. The reasoning can be derived from the earlier reasoning about non-ECN-capable packets, because CE packets are also ignored by the unqueueable ECN marking algorithm.

However, the original standard ECN scheme might well mark packets at a congested node later in the path, following a node earlier in the path that has marked them with the unqueueable ECN scheme. In such cases, the signal will still give the correct average queue length, it will just take longer to converge on the average. The reasoning can be derived from the earlier reasoning about multiple flows sharing a bottleneck. CE marking is applied randomly so it can be thought of as a separate randomly selected subset of packets that will have the same effect on the queue length signal as will separating out a flow of packets.

When data flows pass through a number of buffers in a network, such as along the path through the network in FIG.

1, sometimes more than one buffer will become the bottleneck simultaneously, although it is more typical for the bottleneck to move between different buffers rather than a queue to form simultaneously in two or more.

In the case of two or more simultaneous bottlenecks, with the unqueuable ECN marking scheme in all of them, the resulting signal will give an estimate of the length of the longest of the queues. If the longest queue is later in the path, this measurement will be rounded up to the next integer multiple of the queue length earlier in the path.

For instance, referring to FIG. 1, let us assume that simultaneous constant queues have formed at the buffer into the uplink of CE router (13) and at the buffer into the downlink at PE router (16) for data transfers in the direction from CE router (13) to CE router (17). We shall use the notation q1 and q2 respectively for the two queue lengths, and q for the spacing between ECT(0) codepoints for traffic traversing both bottlenecks.

If q1≥q2, then the measured spacing will simply be
q=q1; q1≥q2,
because only a few ECT(0) markings will leave the earlier bottleneck and the bottleneck later on the path does not revert any ECT(1) markings to ECT(0); it merely ensures that at most one ECT(0) codepoint is in the queue at any one time.

If q2>q1, then
q=⌈q2/q1⌉q1; q2≥q1,
because the earlier queue outputs occasional ECT(0) markings and the later queue can only remove some of these by re-marking them to ECT(1). It cannot move the remaining ECT(0) codepoints closer together, it can only leave them where they are.

(⌈x⌉ is the way to indicate the ceiling function, that is the value of x rounded up to the next integer value.)

In a realistic case, the queue lengths will be variable rather than constant. Then the spacing between ECT(0) markings from the combined queues will vary and the average will be close to the results above.

It will now be described how a sender node can use the feedback of the unqueuable ECN marking signals. During the open-loop control phase of a flow, e.g. at flow-start when the sender is trying to sense how rapidly it could send out packets, it can send out brief bursts of packets at the rate of its attached interface (usually much faster than a bottleneck later in the path). It will send all packets with the ECT(0) codepoint in the ECN field.

We have already described end-to-end transport protocols that feedback the number of each ECN codepoint received. Therefore we will assume that the receiver returns feedback that indicates the resulting ECN codepoint after having passed through unqueuable ECN marking algorithms in the network.

Imagine that the sender sends an initial burst of ten equal-sized packets and after one round trip of delay the fed back ECN markings are, in order:
0,1,1,0,1,1,1,1,1,
where 0 is shorthand for ECT(0) and 1 means ECT(1). This sequence implies that there was probably no queue at all when the first packet arrived (ie. this flow is probably alone in the bottleneck). The spacing of three packets between the first two ECT(0) markings also implies that the sent packet rate was more than two times and up to three times faster than the bottleneck rate.

In fact, if the sent packet rate were r times faster than the bottleneck rate, the spacing between ECT(0) markings would form the sequence r, $r^2$, $r^3$ etc., thus the fact that there is no subsequent zero and therefore the minimum spacing before the next ECT(0) marking is seven packets implies $r^2$≥7. Therefore, from the above feedback sequence, the sender can infer that r>2, r≤3 and r≥√7, or 2.65≤r≤3.

As the first acknowledgements arrive at the sender, it could start releasing further packets while continually updating its best estimate of the available capacity. Once the feedback has arrived on the first four acknowledgements (ACKs), the sender's best estimate of r would be 2.5 (central between 2 and 3). It would therefore be able to start sending packets paced at about 1/2.5 of the rate at which it sent the first round of ten packets (the first round reference rate). Even just before the fourth ACK, the sender would know that r>2. Once all ten acknowledgements from the first round had been returned with no further zeroes in the feedback, its best estimate of r would be about 2.825 (central between 2.65 and 3). It could then increase its average sending rate to about 1/2.825 of the first round reference rate, as a reasonable estimate of the bottleneck rate. To improve its estimate of the bottleneck link rate, it should also add chirps to the pacing, which we will describe later.

When the second round of ACKs starts to arrive, they may all feedback ECT(0), which would imply the chosen rate has been too slow, perhaps only slightly. This is why chirping is also recommended (see later).

However, let us assume that the chosen pacing is instead slightly faster than the available capacity, and that the sequence of feedback returned is
feedback on ACKs: 0,0,0,0,1,0,1,0,1,1,0,1,1,1,0,1,1,1,1,0, 1,1, . . .

This sequence implies that the queue is gradually growing as each packet arrives, as follows:
implied queue length: 1,1,1,1,2,2,2,2,2,3,3,3,3,4,4,4,4,4, 5,5,5,5, . . .

Because this sequence implies that the queue grows by about one packet in every four sent, this implies that the sender should slow down its pacing to send three packets in the time it had been sending four. Thus pacing out packets at about 75% of its previous rate should approximately match the bottleneck rate.

A more precise method will now be described to estimate the rate mismatch ratio r between the rate at which the source sends packets and the available capacity. Given the spacing between ECT(0) markings grows in the sequence r, $r^2$, $r^3$, . . . , dividing one gap by the previous gap will always give the value of r. Even if r varies continuously, every time an ECT(0) arrives, this division will give a good estimate of the instantaneous rate mismatch.

A method of continual incremental estimation will now be described, which may be more robust to packet re-ordering. At any point, a process monitoring the stream of ECT(0)s and ECT(1)s can determine the spacing (gap) $g_j$ between the most recently seen (jth) ECT(0) and the one before it. Consider a store $r_1$ is initialised to zero to accumulate an estimate of r. For every packet arriving after the jth ECT(0) up to and including the next ECT(0)-marked packet, $1/g_j$ is added to $r_1$. If we define the spacing up to this next ECT(0) as $g_{j+1}$, then $1/g_j$ will have been added $g_{j+1}$ times so $r_1=g_{j+1}/g_j$, which is the required ratio r.

Every time an ECT(0) arrives, a monitoring process will be able to estimate the latest value of the mismatch ratio r. Then the stream of values of r can be averaged, either using the straight average over a small sequence of packets, or a moving average such as an exponentially weighted moving average over a continuous stream. Each value of the ratio represents an estimate of the ratio from when the previous ECT(0) arrived at the queue to when the current one did. Therefore, each average value should be weighted by the spacing since the previous ECT(0). With an EWMA, this can be achieved by updating the average with the new ratio once for every packet. Both these forms of averaging are used in the example described below, referring respectively to process steps (380) in FIG. 9b and steps (400) in FIG. 9c.

In a different scenario, if the ACK of the very first packet of a flow signals that ECT(1) was received, it reveals with certainty that other traffic is already queued in the bottleneck buffer. Then the sender will need to proceed with more caution than if the feedback on the first packet of each burst is ECT(0). In contrast, one initial ECT(0) ACK does not imply for certain that the sender is on its own, but the more often this happens, the more likely it is true.

The above examples show that the sender can use the rich information from unqueueable ECN signals in order to rapidly find the correct sending rate with much lower risk of overshooting. Simple algorithms like those above will be necessary to pace sent packets in immediate response to the ever-changing levels of such feedback.

As has already been pointed out, the sender may underestimate rather than overestimate the rate at which to pace outgoing packets, then the following round of feedback will probably signal just a stream of ECT(0) packets, which would give very little useful information on what rate to use next.

A more useful strategy would be to test a wide range of rates in each round by keeping to the overall chosen average rate over a sequence of packets, but varying the spacing between individual packets. The strategy that reveals information fastest, with least potential disruption to other traffic is to send 'chirps' of packets, where a chirp is a train of a small number of packets (e.g. 4 to 12) within which the inter-packet spacing gets closer and closer together, see Kühlewind et al "Chirping for Congestion Control—Implementation Feasibility" [5]. Alternatively, or in addition, packet sizes may be increased during each chirp.

In the first few packets of a chirp, the inter-packet sending rate will probably be below the bottleneck capacity and not form any queue. Then as the packets get closer together, they will start to induce a queue, and the unqueueable ECN marking algorithm will signal the length of this queue by re-marking the requisite number of packets to ECT(1). When one chirp ends and the next starts, it will allow the queue to drain. Then part-way through the next chirp, the queue will start to build again. In this way, the sender can interrogate how much of a queue would build at a range of rates around the average rate, in order to adapt its rate up to the currently available capacity of the bottleneck. This process is possible whether the sender's data flow is alone in the bottleneck, or competing with other flows.

Unqueueable ECN marking provides an explicit measure of the point at which the queue starts to grow. Previous approaches based on chirping have had to accurately measure the change in queuing delay induced by the chirps, which provides a very noisy signal, because there are many other causes of variation in delay, such as interruptions from other processes in the operating system or hardware at either end or in the network. Also the change in delay by adding one more packet to a queue into a fast line is very small—typically much smaller than these other variations in delay. For instance, one extra 1500 B packet of queue into a 1 Gb/s line induces an extra delay of (1500×8)b/1 Gb/s=12 microseconds. In contrast, the unqueueable ECN marking approach gives an explicit signal from which queue length (in packets, bytes and/or time) can be derived no matter how fast the line. Therefore it is proof against future increases in line-speed.

A method will now be described in which a data source adopts a combination of strategies to increase the sending rate of a data flow up to the full available capacity of a link of any capacity in about 2.5 round trip times, while inducing a queue of perhaps no more than approximately eight packets. This compares with the current TCP slow-start process that takes one more round trip to reach the full rate for every doubling of capacity. Also TCP slow start typically overshoots by the number of packets in flight causing potentially thousands of losses before converging on the correct rate, which will lead to exponentially more losses over time given link rates are predicted to continue to grow exponentially over the years.

The data source uses the information from unqueueable ECN marking combined with delay measurements. It combines chirping with sending bursts of back-to-back packets at paced intervals and clocking out new packets triggered by the arrival of acks. The order and duration of each of these sending strategies is designed to maximise the information it will receive in the subsequent round as well as preparing the ground for strategies in following rounds, in order that it will be able to maximise its rate increase while minimising the risk of overshoot.

The described strategy illustrates a reasonable approach that achieves significant performance gains; also significantly reducing the risk of harm to the service of others.

FIGS. 9a, 9b and 9c show one embodiment of the invented process for a data source using general-purpose variables, while FIG. 8 shows an example of this process with specific values assigned to the variables.

The structure of FIG. 8 will first be explained. It illustrates a sequence of events at the data source along a time-line (301) starting at time 0 and extending to time R, which is the round-trip time of the path through the network in question (a typical value of R may be 20 ms or 200 ms, but the invention is not constrained to particular round trip times, so R could extend to communication between processors on a chip over a 20 ns round trip up to inter-planetary round-trip times of 20 minutes or 20 hours). The sequence of events proceeds beyond one round trip sequentially over the rounds numbered #1 to #5 (302), and may continue beyond that (not shown) depending on how much data is to be sent. The primary use of this embodiment of the invention is to get a flow up to full speed, although other embodiments described later may be used to keep the queue short over long data transfers once it has got up to speed. The events in adjacent rounds are separated by horizontal lines (303).

The left-hand edges of the small rectangles such as (304) represent the time when the data source sends each packet, and their width represents the time the sender takes to transmit each packet (its serialisation time, $T_s$). The height of the rectangles is not significant. It should be understood that the process works no differently for much larger densities of packets within each round trip, but the diagram is for illustrative purposes and it would not be useful to show much larger realistic numbers of packets.

Certain significant events along the time-line are labelled with capital letters, e.g. event A (305). Those events that are triggered by the expiry of a timer are shown tagged with a downward pointing triangle. Selected packets usually immediately preceding a gap are tagged with their sequence number (306). In practice, a data source may assign sequence numbers to sent bytes rather than packets. In practice, byte sequence numbers would have to be divided by the packet size to calculate which packet each acknowledgement referred to. However, in order not to clutter the explanation, the illustrated sequence numbers refer to specific packets directly. In each round, just below the line demarcating the previous round, a digit 0 or 1 (307) represents the arrival of feedback revealing the unqueuable ECN information that was marked on the packet shown sent immediately above the line at least one round trip before, and often a little longer due to queuing delay at a bottleneck in the network that also implements the unqueuable ECN protocol. Such feedback packets (acknowledgements or acks) often trigger the release of further packets, which is why packets are often shown being sent at the same point in a round on the timeline as an ack is received. how the well-known self-clocking feature of TCP flow control works.

The significant stages of the process will now be described with reference to the event labels (305) in FIG. 8. These stages correspond to the groups of process steps within dotted rectangles with rounded corners in FIGS. 9*a*, 9*b* and 9*c*. The relevant specific process steps in FIGS. 9*a*, 9*b* and 9*c* are labelled with the same letters as the event labels in FIG. 8. First, the high-level strategy will be outlined, then the stages will be named and briefly described, before explaining each in more detail in a second pass.

FIGS. 9*a*, 9*b* and 9*c* only focus on the process steps needed to illustrate the approach. It is not intended to represent the full process that would be required to cater for all eventualities. For instance, the process steps are not shown that would check whether there is any unqueuable ECN marking at all; or whether there may be a bottleneck on the path that does not support unqueuable ECN marking as well as one that does. Also the focus is on the steps necessary to detect if other traffic is present in the bottleneck, and the strategy to adopt if it is not. The strategies to adopt if other traffic is detected are not shown. However possible methods to handle these secondary cases are introduced discursively in the text. Steps to handle packet reordering; loss; and sending or acknowledgement of variable sized packets are not shown, but again these are discussed in the text. Other peripheral issues are not discussed at all, e.g. user-interruption of the flow; protection against deliberately fabricated feedback; detection of path re-routing; detection of rapid change of the bottleneck rate; exploiting multiple paths; and so forth.

In overview:
  By half way through round #2 the aim is to have determined the likelihood of whether other traffic is active in the bottleneck
  Then, within the early part of the second half of round #2 to have determined a very rough estimate of the bottleneck capacity.
  Then, if the source establishes that there is probably little or no other traffic present, it fills the time until half way through round #3 with half its estimate of the bottleneck capacity.
  It does this with timer-triggered bursts similar in size to a sequence of initial windows of new flows, so that in the worst case the queue due to traffic from this bursty flow should only grow to the size of a TCP initial window and it has roughly twice the time it needs to drain before the next burst.
  The early stages are engineered so that, in the early part of the second half of round #3 the source gains a more precise measurement of available capacity. Then, rather than simply doubling the estimated half-capacity rate of the previous round, it adjusts the doubling up or down slightly in order to hit its new, more precise estimate of the capacity.
  Thus by half way through round #3 (2.5 RTTs since the start), the source should have started sending a fairly correct full window of data spread fairly evenly over the round trip.
  One round later (3.5 RTTs in), there is likely to be a residual rate mismatch which the feedback will measure very precisely. Therefore, from 3.5 RTTs onward, the source should be able to run the link precisely full with a very short queue.

The increase from the initial window straight to roughly half the link capacity is similar in riskiness to the increase by half the link-capacity that TCP makes in the penultimate round trip before overshoot ends slow-start. To mitigate the risk, the proposed strategy samples the queue at three spaced times within the initial round trip and only proceeds with the half-leap if there is no queue at all at any of these times. Otherwise it adopts less aggressive strategies. The rationale is that if the capacity is already more than half full, it is likely that the sampling will discover a queue, and if it is not more than half full, the only risk from filling half the capacity is that something else will simultaneously try to suddenly use half the capacity in the same round trip, which is only the same risk that TCP takes. It is hard to directly compare the proposed mitigation strategy with the way TCP slow-start mitigates the risk by incrementally doubling traffic prior to this penultimate half-leap, in order to test whether it can overflow the queue with lesser amounts of traffic. The proposed strategy is perhaps more cautious, perhaps less, but it is much faster.

We now describe each stage in more detail, but defer implementation detail to a second pass.

Event A is triggered by arrival of a client request (311), which in turn triggers the source of the response to the request to gather some pre-requisite information from its known environment (312).

The source then starts a very short initial chirp (320) represented by events A, B and C.

At event C, the source releases a short initial burst of b packets, back-to-back at the rate of its network interface. The first two packets of the burst also form the last two packets of the chirp.

The source limits itself to this small number of packets in round #1 because it cannot be sure whether the network path it is sending into can even support this many packets in one round trip. Therefore it sends no more packets until it receives feedback that the packets in the initial window were successfully received.

Stage (330) is the start of a large receiving loop that also passes through the stages labelled (340) and (350), that will be described next, until the last ack of the initial window has been received, which breaks out of the loop and triggers event G.

Note that during this receiving loop, unlike TCP-slow-start, the source does not open up the congestion window by one packet every time an ack arrives (except for the first two). The reception of each ack reduces the amount of outstanding data, thus releasing one packet of itself. But the source does not want to release two packets for each ack that arrives during the burst, because it wants to artificially inflate the rate with its own timer so that, in the next round, it can measure how accurate its rate estimate is.

In stage (330), every time an ack arrives from a packet that was sent after an artificially induced delay (rather than back-to-back) the source records the value of the unqueuable ECN feedback it generated (events labelled D). These packets allow the source to test the likelihood that it is alone in the bottleneck. If the feedback from any of the earlier packets in the chirp returns a 1, the source falls back to, a more conservative strategy, e.g. slow-start. If the feedback from the penultimate packet of the chirp is a 1 but the earlier feedback was all 0s, it may either indicate other traffic or a limited capacity bottleneck. So the source would be advised to proceed with some caution, but perhaps deferring any decision to fall-back to slow-start until further evidence of problems (the logic to implement this last decision is not shown).

In stage (340), which is still within the larger receiving loop, the source measures the inter-arrival time between pairs of acks returning from the initial burst (starting at event E), and accumulates a running average in order to derive an initial estimate of the serialisation delay of the bottleneck $T_b$. Because delay measurements are notoriously imprecise, the implementation waits until it has measured half the acks from the burst before using any of the measurements. To save wasting valuable sending time while accumulating these measurements, the source clocks out new packets (four in the example in FIG. 8) at the ack rate until this point (event F).

In stage (350), once enough measurements have been averaged (event F) the source suppresses further ack-triggered release of packets (by decrementing the congestion window on each ack), and instead releases a paced sequence of packets $r_t$ times more frequently than its estimate of the bottleneck serialisation time $T_b$, where $r_t$ is a little greater than 1 (e.g. 5/3) in order to deliberately induce a slight queue. The source paces out enough packets to have sent twice as many in round #2 as in the first round.

It is important that the source paces these packets based on its own delay measurements, not by clocking against arriving acks, because in the next round it will calibrate its initial rough estimate of the bottleneck serialisation delay $T_b$ by comparing the queue growth signalled by the unqueueable ECN protocol with the queue growth it would expect having deliberately mismatched the rate by $r_t$ relative to its delay measurements taken using its own clock.

Once the three interleaved stages (330), (340) and (350) end successfully (event G in stage 350), the source can divide its rough estimate of $T_b$ into its round trip time to give a rough estimate of the window of packets W that the bottleneck can sustain. However, given delay measurements are notoriously imprecise, the source prepares to fill the rest of the round trip until 5R/2 with a window of only half this estimated size, having subtracted off the number of packets it had already sent since 3 R/2.

Rather than sending out nearly half the window all in one back-to-back burst, the source divides the remaining window into bursts each the size of the initial window, and paces these bursts out over the remaining time until 5R/2 (events H within stage 360). It schedules the start of the first burst to allow just enough space for the packets that will be sent in the next round in response to the burst of packets it has just sent, assuming they will be clocked by the bottleneck at the same rate as the feedback from the last round. One round later, once it has a better estimate of the bottleneck capacity, it adjusts how many packets it actually sends in response to feedback from the present round in order to more precisely fill both the time it sets aside before starting the first burst, and the time it sets aside between bursts.

In parallel to sending these bursts, in stage (370) the source watches for the arrival of feedback from the packets triggered by the packets that were themselves triggered by the first two packets of the flow (events J). It continues to monitor the unqueueable ECN feedback from the first packet of each burst. If any of this feedback is 1, it is a sure sign that queuing is being induced by traffic other than its own. In the example implementation in FIG. 9b, the source accumulates the values of feedback from these initial packets of each burst in a 'vigilance level' parameter v, using a moving average. The value of this parameter will lie between zero and one, remaining at zero if there is no competing traffic at all. This parameter could be used to scale down the aggressiveness of the other stages of the process in proportion to the measured probability that other traffic is present. However, the implementation of this adjustment is not shown.

Stage (380) starts when the source detects the first feedback from the packets it sent in the previous round (#2) that were triggered by timers slightly ($r_t$ times) faster than the ack-rate (event K on the ack from packet 15 in the example). The unqueueable ECN signals in this feedback should start at zero (an empty queue) and show a rate-mismatch of about $r_t$. The task of stage (380) is to find the actual rate mismatch r using the unqueueable ECN signals in the feedback and the approach described earlier that divides each gap between ECT(0)s by the previous gap. The main loop triggered by the arrival of each ack in stage (380) is one way to implement this method, as well as maintaining a running average of the rate mismatch r. An explanation of the implementation steps is deferred to the second pass through the process, later. The method can only update the average of r whenever ECT(0) feedback is received. This implies that a trailing sequence of ECT(1) feedback would be ignored. This gap should be ignored if it would decrease the average r. However, if it is already large enough to increase r even though it is truncated, it can be used by assuming that the next feedback to arrive would have been ECT(0). Therefore, once the final ack of the burst is received (sequence number 30 in the example in FIG. 8), the method does a final check to see whether the average of r would increase if the truncated gap were one packet larger. If so, it runs the main loop one more time to fabricate the arrival of ECT(0) feedback on a hypothetical ack.

The number of packets in the initial burst in round #1 is chosen so that there will be room for the most likely patterns of ECT(0) feedback signals from double the number of paced packets sent in round #2. For instance, if the test rate mismatch ratio were 2, this would lead to gaps of 2,4,8,16, . . . , which require a total of respectively 3,7,15,31, . . . packets to signal sequentially. In our example, we only use the signals on the 12 timer-paced packets, so a test rate mismatch ratio of 2 would only signal be able to measure two gaps (on the $3^{th}$ and $7^{th}$ packets) and the other five packets would be wasted. This is why a smaller rate mismatch ratio is better; for instance using 5/3 should fit three gaps between ECT(0) marks in 12 packets with two packets spare (including one hypothetical packet, as discussed above), in case the actual rate mismatch r is a little greater than 5/3.

Therefore an initial burst of 8 packets is a useful compromise between a sufficiently long feedback sequence and a sufficiently short initial window. An initial burst of 8 would eventually trigger 16 feedback signals in round #3, allowing the signals to still fit in the available packet sequence even if r was roughly 12.5% greater than 5/3 for a particular flow. However, any larger mismatch than 12.5% would push the third ECT(0) signal beyond the $13^{th}$ packet, leaving only the poor precision of the two earlier ECT(0) signals.

By the end of stage (380), the source has calculated the rate mismatch ratio r from ECT(0) marking feedback. If r is significantly greater than $r_t$, it may imply that the unqueueable ECN signals are coming from one bottleneck, but there is another bottleneck in series on the path that does not support unqueueable ECN signalling but it is more restrictive than the one that does. Therefore, if $r \gg r_t$, the process should fallback to a less aggressive approach (not shown).

In stage (390) within FIG. 9c, the source uses the rate mismatch ratio r calculated in stage (380), to adjust the congestion window c, correcting its previous estimate of the available capacity (event L). If capacity was underestimated, this will release additional packets. If capacity was overestimated, this will hold back a few packets from being released in response to subsequent feedback, until the window is correct. The method shown makes this correction once, only when a final rate mismatch has been estimated. An alternative would be to make this adjustment continually during stage (380); after every feedback signal (16 times in the example). However, the early estimates of the rate mismatch are likely to be imprecise, so this is a trade-off between making one potentially large correction at the end, or making many corrections with the risk that the early ones are large and have to be corrected on later packets.

In stage (400), the source then prepares to receive the acks from the series of paced bursts it sent at the end of round #2 and the first half of round #3. It originally halved its estimate of the window needed to fill available capacity, so it now doubles the adjustment factor r/r that it will use to open the window in response to each ack. It waits for each ack to arrive before traversing the receiving loop within stage (400). For each ack it opens up the window to release roughly 2 packets, but adjusted to be slightly less if the measured rate mismatch r was greater than the test rate mismatch $r_t$, and slightly more if it was less.

Every time it traverses the receiving loop in stage (400) it checks if the ack sequence number implies it is from the start of each burst and, if so (events M), it records the feedback within the ack from the unqueueable ECN signal. The more often the feedback shows the bottleneck signalled ECT(1) at the start of each burst, the more likely it is that other traffic is competing for the same bottleneck. In the embodiment illustrated in FIG. 9c, the source maintains an exponentially weighted moving average (EWMA) of all these values in the variable v (the 'vigilance level') that it has already been maintaining for this purpose. However, other means for recording these values may be used. It will be noted that the source adjusts the constant it uses for the EWMA before entering the receiving loop in stage (400), in order to smooth the newly arriving values over the number of bursts it sent.

The source enters stage (410) once it detects that the last ack of the sequence of bursts has arrived (event N). The packets sent in the previous round should have filled the whole round fairly precisely, therefore event N represents the start of what would traditionally be called the congestion avoidance phase in traditional TCP implementations. However, to check whether it is indeed correctly filling available capacity, in stage (410) the source continues to use the unqueueable ECN feedback in each ack for at least another whole round to measure the rate mismatch ratio r. It will be seen that the implementation of stage (410) is very similar to the previous steps for measuring the rate mismatch ratio in stage (380). In fact the steps are identical, except stage (380) gave equal weight to all the feedback when calculating the average ratio, whereas the embodiment of stage (410) uses an EWMA to accumulate the ratio, which gives more weight to more recent values. Other strategies for averaging the ratio could have been adopted. However, the rationale for the two approaches chosen in the embodiment shown in FIGS. 9b and 9c is that the average calculated by stage (380) was over a short constant burst, whereas that calculated in stage (410) is over a long sequence of many bursts.

As stage (410) progresses, the evolving rate mismatch ratio would be used to make any necessary adjustments to the congestion window. This would be adapted to whatever congestion avoidance strategy it used of the many that exist (e.g. TCP Reno, Compound TCP, Cubic TCP, etc). The specific adjustment step is not shown, given it will depend on the specific complementary approach adopted. However it will be seen that the most up to date moving average of the rate mismatch ratio is calculated on every ack. So the source could make an adjustment to its congestion avoidance response to each ack. This complementary approach to congestion avoidance could continue indefinitely for the rest of the flow, or it could end after one round. Nonetheless, by event N it will be seen that the source has already filled the available capacity and established the ack clock for the next round without inducing a queue of more than the initial window (10 packets in the example shown).

Variants of the above embodiment will now be described that may be preferred in certain circumstances.

Burst Before Chirp in Round #1

In the first round, the source may start with a burst, and then send spaced packets later in the round, in a chirp or chirps or using some other spacing. The advantage of sending the burst and the chirp this way round is that the source gets started sending more packets earlier, which follows through to a faster average start-up rate in subsequent rounds. The disadvantage of bursting before the chirp is that the source knows that the source can no longer know whether a queue discovered at the start of the chirp was induced by its own earlier burst or by another traffic source.

Ack-clocked Bursts in First Half of Round #2

In the embodiment described earlier and, illustrated in FIGS. 9a, 9b and 9c does not send any significant traffic until the second half of round #2. If the vigilance level v is low at the start of round #2, implying that it is unlikely other traffic is competing for the bottleneck, the source could send initial window-sized bursts in response to the arrival of acks from the initial packets of the chirp, rather than just packet pairs. This would get more traffic being sent earlier. Also the bursts subsequently started in the latter half of round #2 could be scheduled around these new additional bursts.

Use of Smaller Packet Sizes.

Rather than varying the spacing between packets, it would be possible to start with smaller packets, and send larger packets to vary the rate upwards. The advantage of this approach is that it may be possible to use ack-clocking rather than timers. The disadvantage is that the rate at the bottleneck depends on the size of layer-2 frame headers and any tunnel headers at the bottleneck, which are not known by the source. If the source uses the same size for all packets, this overhead cancels out so that the source does not need to know it. However, if the source varies packet size, it would need to know or guess the bottleneck frame header size to be able to measure the effect of its actions with reasonable precision.

Unqueueable ECN marking offers another important benefit over traditional congestion signalling protocols; it allows the source to distinguish transmission losses from congestion losses with high probability of being correct. Currently, a source has to assume any loss might be due to congestion and reduce its rate accordingly—typically by half. However, if any loss was actually due to a transmission error (e.g. due to radio interference), and it had known that, it would not need to reduce its rate at all. This uncertainty currently leads to very poor utilisation of some links, particularly wireless links where radio interference is a common problem. An embodiment to realise this goal will now be described, building on the embodiment just described and illustrated in FIGS. 9a, 9b and 9c. If the source detects a loss or burst of losses at any stage in the sending of a flow of packets, it should refer to the unqueueable ECN marking feedback before and after the loss episode to infer the likely length of the queue before and after the loss. For instance, it could measure the spacing between at least the previous two and the following two ECT(0) feedback signals. To be conservative, it should assume the loss itself or the losses themselves would have carried ECT(1) signals. If the queue both before and after the loss or losses is very short (e.g. less than twelve packets), the source can assume with high probability that the loss was not due to queue overflow, but instead was due to a transmission loss. In such a case it would not need to reduce its rate.

It has been suggested that standard explicit congestion notification (ECN) could also be used to distinguish congestion from transmission losses. However, ECN signals are delayed in the network by an aggressive smoothing algorithm, whereas a bottleneck sends unqueueable ECN signals without smoothing or delay. Also, a source can measure whether the bottleneck supports unqueueable ECN (as described earlier), whereas it cannot measure whether ECN is turned on at the bottleneck.

If the sender sends out all packets marked ECT(0) and feedback shows that nowhere on the network path have any been changed to ECT(1), it may be a sign of two possible scenarios:
the smallest available capacity on the path is greater than the highest rate at which the sender can send and therefore there is no network bottleneck
the network bottleneck does not implement unqueueable ECN marking.

Even if some ECT(1) feedback is returned, this may be a sign that a first bottleneck implements unqueueable ECN marking, but then the traffic encounters a subsequent more constricted bottleneck that does not implement unqueueable ECN marking.

Therefore, to be safe, the sender should proceed cautiously if there are signs of a bottleneck that does not implement unqueueable ECN marking. It can test this by measuring the ACK-rate, that is, the rate at which acknowledgements are returned. Then it calculates a tentative rate that it will use based on unqueueable ECN markings. If the ACK-rate is significantly slower than this tentative rate, the sender should proceed cautiously (e.g. using the traditional TCP slow-start). If the ACK-rate and the tentative rate are approximately the same, the sender can assume that the rate it has tentatively inferred from unqueueable ECN marking is good to use.

This may raise the question of why the ACK-rate cannot always be used to determine the bottleneck capacity, making unqueueable ECN marking redundant. The answer is that it is hard to measure the ACK-rate accurately, whereas unqueueable ECN marking gives a precise explicit signal. Therefore, avoiding sending significantly faster than the ACK-rate is a useful safety check, but the ACK-rate alone is too imprecise to use alone.

The invention may be used for estimating the queue length at a node or across a path through a network of nodes to solve problems other than that where a sender wishes to quickly adapt its sending rate to the available capacity. For instance:
A test probe may wish to send a minimal amount of test traffic to measure available capacity; such a probe may be used:
for the network operator to test the performance of the network while causing minimal disruption to existing traffic;
for an application to test whether there is sufficient available capacity to start a new session with minimal disruption to existing traffic.
A network operator may wish to regularly monitor the length of queues in the network by passively measuring the spacing between ECT(0) markings in traffic passing a monitoring point, by selecting packets with source and destination addresses that indicate they have traversed a point of interest in the network, or a path of interest through multiple nodes.
A network operator or an application may send a stream of packets to monitor the delay due to queuing on the path indicated by the delay between two ECT(0) markings.
A network operator or an application may send a stream of packets to monitor the base delay along a path through the network by measuring the overall delay and subtracting the queuing delay. The one-way base delay could be measured by taking two packets that arrive at the receiver with ECT(0) markings and measuring the time between sending the second and receiving the first. The two-way base-delay could be measured similarly by echoing packets off an echo-server at the remote end of the network and adding together the one-way base delays in either direction, by monitoring the spacing between feedback of ECN markings in the forward direction and the spacing of ECN markings themselves in the reverse direction.
Alternatively, the base delay could be measured by sending a stream of well-spaced-out packets and measuring the delay for those that return with a sequence of ECT(0) values that prove no queuing had been experienced.

Exemplary embodiments of the invention are realised, at least in part, by executable computer program code which may be embodied in application program data provided by program modules managing the buffers of respective routers, switches or other middleboxes in the network or in end-systems. When such computer program code is loaded into the memory of each router, switch, middlebox or end-system for execution by the respective processor, it provides a computer program code structure which is capable of performing the functions of the buffer in accordance with the above described exemplary embodiments of the invention.

Furthermore, a person skilled in the art will appreciate that the referenced computer program structure can correspond to the process flow shown in FIGS. 9a, 9b and 9c where each step of the processes can correspond to at least one line of computer program code and that such, in combination with the processor in the respective router, switch, middlebox or end-system, provides apparatuses for effecting the described process.

The above embodiments are to be understood as illustrative examples of the invention. Further embodiments of the invention are envisaged. For example, the modules or part of the modules for effecting the described process can be implemented in hardware or a combination of hardware and software.

The method for determining the queue length of an intermediate node and the modules needed therefore can be implemented in the sender node, the receiver node another intermediate node or partly in each. For example the receiving node could calculate the queue length and feed it back together with the sequence of tag values to the sender node where after the sender could perform a more detailed analysis of the tag value sequence such as determining the discrepancy between the packet sending rate and the rate of the buffer and adapting the packet sending rate to the rate of the buffer.

In summary, there is a method and apparatus for a packet data flow to use markings on packets that indicate the longest instantaneous queue length on a path in order to rapidly increase the flow rate up to the available capacity without overshoot, hence avoiding the TCP Slow start process.

The invention can also be used for example during a long-running flow to rapidly find a new operating rate when other traffic departs from the system.

REFERENCES

[1] Satoh, D., Maeda, Y., Phanachet, O. & Ueno, H., "Single PCN Threshold Marking by using PCN baseline encoding for both admission and termination controls," *Internet Engineering Task Force* Internet Draft draft-satoh-pcn-st-marking-01 (March 2009) (Work in progress) <http://tools.ietf.org/html/draft-satoh-pcn-st-marking-01>

[2] Xia, Y., Subramanian, L., Stoica, I. & Kalyanaraman, S., "One more bit is enough," Proc. ACM SIGCOMM'05, Computer Communication Review 35(4):37-48 (2005)

[3] S. S. Kunniyur, "AntiECN Marking: A Marking Scheme for High Bandwidth Delay Connections," Proceedings, ICC, Alaska, May 2003. <http://www.seas.upenn.edu/~kunniyur/bapers/aecn.html>

[4] Kühlewind, M. & Scheffenegger, R., "More Accurate ECN Feedback in TCP," *Internet Engineering Task Force* Internet Draft draft-ietf-tcpm-accurate-ecn-01 (July 2012) (Work in Progress)

[5] Kühlewind, M. & Briscoe, B., "Chirping for Congestion Control—Implementation Feasibility," In: *Proc. Int'l Wkshp on Protocols for Future, Large-scale & Diverse Network Transports* (PFLDNeT'10) (November 2010)

[Hu03] Ningning Hu and Peter Steenkiste. "Improving tcp startup performance using active measurements: Algorithm and evaluation." In Proc. IEEE International Conference on Network Protocols. IEEE, November 2003. <http://www.cs.cmu.edu/~hnn/papers/past-icnp03.pdf>

[Ha08] Sangtae Ha and Injong Rhee. "Hybrid slow start for high-bandwidth and long-distance networks," In Proc. PFLDNeT'08 (2008). <http://netsrv.csc.ncsu.edu/export/hybridstart_pfldnet08.pdf>

[Cav09] Dirceu Cavendish, Kazumi Kumazoe, Masato Tsuru, Yuji Oie, and Mario Gerla. CapStart: An Adaptive TCP Slow Start for High Speed Networks. In Evolving Internet (INTERNET '09), First Int'l Conf on, pages 15-20, 2009.

[RFC4782] Floyd, S., Allman, M., Jain, A. & Sarolahti, P., "Quick-Start for TCP and IP," Internet Engineering Task Force Request for Comments 4782 (January 2007). <http://www.icir.org/floyd/quickstart.html>

[Liu07] Liu, D., Allman, M., Jin, S. & Wang, L., "Congestion Control Without a Startup Phase," In: Proc. Intl Wkshp on Protocols for Future, Large-scale & Diverse Network Transports (PFLDnet'07) (2007) <http://192.150.187.12/mallman/papers/jumpstart-pfldnet07.pdf>

[Padman98] Padmanabhan, V. N. & Katz, R. H., "TCP Fast Start: A Technique For Speeding Up Web Transfers," In: Proc. Globecom Internet Mini-Conference IEEE (1998) <http://research.microsoft.com/en-us/um/people/padmanab/publications.htm>

[Akyildiz01] Akyildiz, I., Morabito, G. & Palazzo, S., "TCP-Peach: A New Flow Control Scheme For Satellite Networks," IEEE/ACM Transactions on Networking (2001) <http://www.ee.gatech.edu/research/labs/bwn/papers/2001/j8.pdf>

[Alizadeh12] Alizadeh, M., Kabbani, A., Edsall, T., Prabhakar, B., Vandat, A. & Yasuda, M., "Less Is More: Trading a Little Bandwidth for Ultra-Low Latency in the Data Center," In: Proc. USENIX Symposium on Networked Systems Design and Implementation (NSDI'12) (April 2012)

U.S. Pat. No. 7,680,038 Gourlay, "Dynamic bandwidth detection and response for online games", Mar. 16, 2010.

The invention claimed is:

1. A method for initialising a flow of packets between a source node and a node along a path in a network, comprising at the source node:
   sending one or more initial burst of packets over a round-trip at a chosen rate;
   receiving from the network node a sequence of feedback packets each having a tag status value, wherein the network node is arranged in operation to indicate a queue length at the network node at the arrival of a packet from the initial burst or bursts of packets, checking, at the time of arrival of said packet, if any packet already in a queue has upon leaving the queue a status tag set to said first status value; and
   if so changing the tag status value of the received packet to a different status value;
   estimating from the sequence a mismatch between the chosen rate and a rate available at the network node; and
   sending a further burst of packets using a fraction of said initially chosen rate.

2. A method according to claim 1 where the initial burst of packets comprises 6 to 12 packets.

3. A method according to claim 1 comprising varying the spacing between packets over the round-trip.

4. A method according to claim 3 wherein the spacing between packets is varied by varying the size of the packets.

5. A method according to claim 3 wherein the spacing is measured in packets, in bytes or in time.

6. A method according to claim 1 comprising the source node further releasing a paced sequence of packets at a higher rate than the estimated achievable rate of the network node in order to induce a slight queue at the network node, and in the next round of sent packets calibrating the estimate of the network node rate by comparing a determined queue growth with an expected queue growth.

7. A method according to claim 6 comprising the source node monitoring the tag status value relating to the first packet in each burst of packets in order to estimate a level of competing traffic.

8. A method according to claim 1 further comprising the source node measuring an inter-arrival time between pairs of acknowledgment packets returning from the initial burst and accumulating a running average in order to derive an initial estimate of delay at the network node.

9. A method according to claim 1 further comprising determining a mismatch ratio between the rate at which the source node sends packets to the network node and the rate achievable at said network node by determining from said received sequence of tag status values a spacing between a received packet having a status tag set to said first status value and the previously received packet having a status tag set to said first status value; and calculating said mismatch ratio by dividing the determined spacing by the most recent, previously determined spacing.

10. A method according to claim 9, wherein the calculating step is implemented as a repeated addition.

11. A method according to claim 9 comprising the source node adjusting the size of a sending window or rate based on the rate mismatch ratio.

12. A non-transitory computer readable storage medium storing a computer program or a suite of computer programs, which upon execution by a computer, performs the method according to claim 1.

13. A source node arranged in operation to determine a mismatch ratio between a rate at which the source node is configured to send packets to one or more nodes along a path in a network and the available capacity of at least one of said nodes, said source node comprising:
 a receiving module arranged to receive a sequence of tag status values associated with packets which have been routed via one or more of said other nodes, wherein at least one of said nodes is arranged in operation to indicate its queue length by, upon receiving a packet carrying a status tag set to a first status value, to check at the time of arrival of said packet, if any packet already in a queue has upon leaving the queue a status tag set to said first status value; and if so to change the tag status value of the received packet to a different status value;
 a module arranged to determine the spacing between a received packet having a tag status value set to said first status value and the previously received packet having a tag status set to said first status value; and
 a calculation module arranged to calculate said mismatch ratio by dividing the determined spacing by the most recent, previously determined spacing.

14. A method for distinguishing between transmission losses and congestion losses in a packet network comprising:
 receiving at a source node a sequence of tag status values associated with packets which have been routed via one or more other nodes in a network, wherein at least one of said other nodes is arranged in operation to indicate its queue length by the spacing between packets associated with a first tag status value;
 detecting a loss of packets;
 determining from said sequence of tag status values a first spacing between a pair of packets having said first tag status value, which packets were received before said loss, and optionally a second spacing between a pairs of packets having said first tag status value, which packets were received after said loss;
 determining from said spacing or spacings the length of the queue before the loss and optionally the length of the queue after the loss; and
 if the length of each queue is less than a defined number of packets categorising the loss as a transmission loss.

15. A method for initialising a flow of packets between a source node and a node along a path in a network, comprising at the source node:
 sending one or more initial burst of packets over a round-trip at a chosen rate;
 receiving from the network node a sequence of feedback packets, said sequence indicating a queue length at the network node at the arrival of a packet from the initial burst or bursts of packets;
 estimating from the sequence a mismatch between the chosen rate and a rate available at the network node;
 sending a further burst of packets using a fraction of said initially chosen rate; and
 releasing a paced sequence of packets at a higher rate than the estimated achievable rate of the network node in order to induce a slight queue at the network node, and in the next round of sent packets calibrating the estimate of the network node rate by comparing a determined queue growth with an expected queue growth.

* * * * *